United States Patent
Shwartz et al.

(10) Patent No.: US 11,688,055 B2
(45) Date of Patent: Jun. 27, 2023

(54) METHODS AND SYSTEMS FOR ANALYSIS OF WAFER SCAN DATA

(71) Applicant: Applied Materials Israel Ltd., Rehovot (IL)

(72) Inventors: Guy Shwartz, Ramat Gan (IL); Ido Almog, Rehovot (IL)

(73) Assignee: Applied Materials Israel Ltd., Rehovot (IL)

( * ) Notice: Subject to any disclaimer, the term of this patent is extended or adjusted under 35 U.S.C. 154(b) by 233 days.

(21) Appl. No.: 17/160,364

(22) Filed: Jan. 27, 2021

(65) Prior Publication Data

US 2022/0237758 A1 Jul. 28, 2022

(51) Int. Cl.
*G06K 9/00* (2022.01)
*G06T 7/00* (2017.01)

(52) U.S. Cl.
CPC .... *G06T 7/001* (2013.01); *G06T 2207/20081* (2013.01); *G06T 2207/30148* (2013.01); *G06T 2207/30168* (2013.01)

(58) Field of Classification Search
CPC ........... G06T 7/001; G06T 2207/20081; G06T 2207/30148; G06T 2207/30168
See application file for complete search history.

(56) References Cited

U.S. PATENT DOCUMENTS

| | | | |
|---|---|---|---|
| 10,460,434 B2 | 10/2019 | Martin et al. | |
| 2012/0141012 A1* | 6/2012 | Sakai | G01N 21/9501 382/149 |
| 2012/0294507 A1* | 11/2012 | Sakai | G01N 21/9501 382/149 |
| 2018/0342051 A1 | 11/2018 | Sezginer et al. | |
| 2019/0066291 A1* | 2/2019 | Martin | G06T 7/0008 |
| 2020/0232934 A1* | 7/2020 | Feldman | G06T 7/001 |
| 2020/0400589 A1* | 12/2020 | Feldman | G06T 7/0008 |

* cited by examiner

*Primary Examiner* — Samir A Ahmed
(74) *Attorney, Agent, or Firm* — Lowenstein Sandler LLP

(57) ABSTRACT

Disclosed is a computerized method for detecting defects on a sample. The method includes: (i) receiving scan data corresponding to a pixel on the sample; (ii) computing a difference vector d based on the scan data and corresponding reference data; (iii) computing a parameter D dependent on $t = \Gamma d - (G_{linear}/\|\Gamma s\|^2)\Gamma s$, wherein $\Gamma^T\Gamma = K^{-1}$ with K being a covariance matrix corresponding to the pixel, s is a predetermined kernel characterizing a defect signal, and $G_{linear} = s \cdot (K^{-1} d)$ is a gaussian approximation of a likelihood ratio test expression for distinguishing the defect signal from noise, and wherein D substantially monotonically increases with $\|t\|$; and (iv) computing a score $q(g, D)$ indicative of whether the pixel is defective, wherein g is a parameter indicative of a value of $G_{linear}$ and $q(g, D)$ substantially monotonically increases with g and substantially monotonically decreases with D.

20 Claims, 12 Drawing Sheets

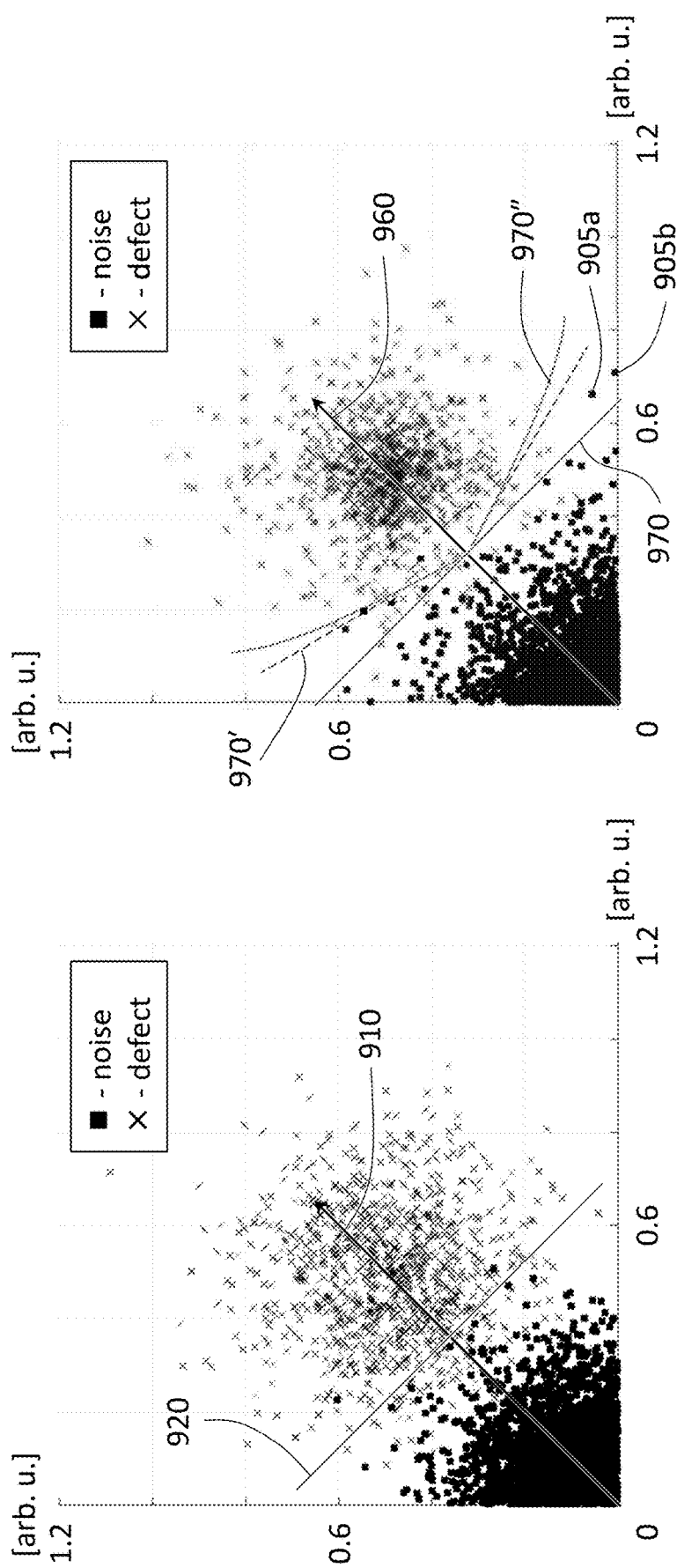

METHODS AND SYSTEMS FOR ANALYSIS OF WAFER SCAN DATA

TECHNICAL FIELD

The present disclosure relates generally to wafer analysis.

BACKGROUND

The challenge in detecting defects on wafers is to distinguish a defect signal from noise. With the shrinking of design rules, wafer analysis tools are accordingly required to detect increasingly smaller defects and the challenge becomes increasingly harder. Previously, defect detection was mainly limited by laser power and detector noise. Currently, state-of-the-art wafer analysis tools are mostly limited by wafer noise, which is typically non-gaussian and non-stationary. In particular, wafer noise may resemble fluctuations arising from process variation across the wafer, making the distinction there between (and, consequently, the detection of defects) especially challenging. There remains an unmet need in the art for wafer analysis techniques, which allow accurately and efficiently distinguishing defect signals from wafer noise.

SUMMARY

Aspects of the disclosure, according to some embodiments thereof, relate to wafer analysis. More specifically, but not exclusively, aspects of the disclosure, according to some embodiments thereof, relate to methods for detecting defects on wafers characterized by non-gaussian noise.

Thus, according to an aspect of some embodiments, there is provided a computerized method for detecting defects or potential defects on a sample (e.g. a patterned wafer). The method includes operations of:

Receiving scan data obtained in a scan of a sample. The scan data corresponds to a tested pixel on the sample.

Computing a difference vector d based on the scan data and corresponding reference data.

Computing a parameter D, which depends on a vector $t = \Gamma d - (G_{linear}/\|\Gamma s v^2\|)\Gamma s$. $\Gamma^T \Gamma = K^{-1}$ with K being a noise covariance matrix corresponding to the tested pixel. s is a predetermined kernel characterizing a defect signal. $G_{linear} = s \cdot (K^{-1} d)$ is a gaussian approximation of a likelihood ratio test expression (also referred to as "gaussian-based approximation expression") for distinguishing the defect signal from noise. The parameter D substantially monotonically increases with $\|t\|$ (i.e. D substantially monotonically increases as $\|t\|$ increases), at least over a range of values of $\|t\|$ characteristic of sample analysis.

Computing a score $q(g, D)$ indicative of a probability of the tested pixel being defective. g is a parameter indicative of a value of $G_{linear}$. $q(g, D)$ is a substantially monotonically increasing function of g and a substantially monotonically decreasing function of D, at least for ranges of values of g and D characteristic of sample analysis.

The score $q(g, D)$ generalizes the gaussian approximation of the likelihood ratio test expression (i.e. $G_{linear}$) by additionally taking into account the parameter D, and, as such, improves defect detection rates.

According to some embodiments, the method further includes checking whether $q(g, D)$ is greater than a threshold, and labeling the tested pixel as defective, or potentially defective, when $q(g, D)$ is greater than the threshold.

According to some embodiments, the scan data of the tested pixel include scan data of a plurality of pixels neighboring the tested pixel, and the reference data include reference data pertaining to each of the pixels (i.e. the tested pixel and the neighboring pixels).

According to some embodiments, the parameter D depends substantially only on $\|t\|$. That is, the parameter D is dependent on $\|t\|$ but substantially not on other components of t (e.g. $D = D(\|t\|)$, wherein it is understood that D is a one-variable function).

According to some embodiments, $q(g, D) = q_0(g) - A(g) \cdot q_1(D)$ with $q_0$ and $q_1$ being substantially monotonically increasing functions and A being a substantially monotonically increasing function (which covers the option that A is substantially constant), and $q_1 \geq 0$ and $A > 0$.

According to some embodiments, $q_0(g)$ substantially equals g, $q_1(D)$ substantially equals D, and $A = 1$.

According to some embodiments, g substantially equals $G_{linear}$.

According to some embodiments, D substantially equals $c\|t\|$ with c being a positive constant. According to some such embodiments, the method further includes an initial operation, wherein a value of c is determined, based on preliminary scanning of one or more areas of the sample and/or other samples of a same architecture as the sample or including regions of a same architecture as corresponding regions on the sample.

According to some embodiments, the reference data include scan data from a plurality of references respectively corresponding to a plurality of previously scanned areas fabricated to a same design as an area including the tested pixel.

According to some embodiments, the area including the tested pixel is non-repetitive within a die including the area, or at least along an intersection of the die and a slice including the area. Each scanned area, from the plurality of previously scanned areas, is positioned on a respective die from a plurality of dies.

According to some embodiments, the area including the tested pixel is repetitive within a die including the area, or at least along an intersection of the die and a slice including the area. At least one of the scanned areas, from the plurality of previously scanned areas, is positioned along the intersection.

According to some embodiments, the scan data include scan data corresponding to a multiplicity of perspectives. According to some such embodiments, at least some of cross-perspective terms in the noise covariance matrix are set to zero to lighten computational load.

According to some embodiments, artificial intelligence tools, such as machine learning tools, may be used in determining (i) a functional dependence of the score $q(g, D)$ on the parameters g and D, (ii) a functional dependence of the parameter g on $G_{linear}$, (iii) a functional dependence of the parameter D on the magnitude of the vector t, (iv) a number of neighboring pixels (i.e. pixels neighboring the tested pixel) whose scan data is included in the scan data corresponding to the tested pixel and which are used in computing the respective covariance matrix, (v) a number of references, and/or (vi) a number of perspectives.

According to some embodiments, the method further includes checking for potential presence of a plurality of different defect types. Each defect type is characterized by a respective predetermined kernel. The checking includes serially implementing the operation of computing a parameter D, and the operation of computing a score, with respect to each of the predetermined kernels. According to some such embodiments, (i) a functional dependence of the score q(g, D) on the parameters g and D, (ii) a functional dependence of the parameter g on $G_{linear}$, (iii) a functional dependence of the parameter D on the magnitude of the vector t, (iv) a number of neighboring pixels (i.e. pixels neighboring the tested pixel) whose scan data is included in the scan data corresponding to the tested pixel and which are used in computing the covariance matrix, (v) a number of references, and/or (vi) a number of perspectives, is dependent on the defect type.

According to some embodiments, the noise distribution (i.e. the density of events in the probability space) is non-gaussian and/or non-stationary.

According to some embodiments, for sufficiently small noise values the noise distribution is substantially gaussian, and for sufficiently large noise values the noise distribution decays exponentially (e.g. for large noise values u, the probability distribution scales as ~ $\exp(-\lambda \cdot u)$).

According to some embodiments, a first range of noise values, over which the noise is substantially gaussian, and a second range of noise values, over which the noise distribution decays exponentially, are such that a first area, defined by an integral of the noise distribution over the first range, is greater by at least about two orders of magnitude, than a second area, defined by an integral of the noise distribution over the second range. According to some such embodiments, the first range and second range are complementary (i.e. extend over all the probability space).

According to some embodiments, the method further includes scanning the sample or one or more regions thereof to obtain the scan data corresponding to the tested pixel as well as scan data corresponding to additional pixels on the sample.

According to some embodiments, the method further includes performing additional implementations thereof with respect to scan data corresponding to the additional pixels, thereby inspecting the sample or one or more regions thereof.

According to some embodiments, in each of the additional implementations, a functional dependence of the score q(g, D) on the parameters g and D, and/or functional dependencies of the parameters g and/or D on $G_{linear}$ and the magnitude of the vector t, respectively, are dependent on a position on the sample of the additional pixel with respect to which the implementation is performed. (That is, functional forms of q(g, D), g, and/or D may vary between different locations on the sample.)

According to some embodiments, the method further includes an initial operation wherein a functional dependence of the score q(g, D) on the parameters g and D, and/or functional dependencies of the parameters g and/or D on $G_{linear}$ and the magnitude of the vector t, respectively, are determined based at least on scan data obtained prior to the scan.

According to some embodiments, a functional dependence of the score q(g, D) on the parameters g and D, and/or a functional dependence of the parameter g on $G_{linear}$ and/or a functional dependence of the parameter D on the magnitude of the vector t, is dependent on a position on the sample of the pixel. According to some such embodiments, artificial intelligence tools, such as machine learning tools, may be used in determining the one or more functional dependencies.

According to some embodiments, the computations involved in computing the scores of the pixels are performed in runtime. According to some such embodiments of the method, the computations are performed in real-time or near real-time.

According to some embodiments, the threshold is predetermined.

According to some embodiments, the threshold is determined in runtime.

According to some embodiments, K and/or s are determined based on, or also based on, scan data obtained in preliminary scanning of one or more representative regions of the sample.

According to some embodiments, one or more of K, s, and T are determined based on, or also based on, scan data obtained in runtime.

According to some embodiments, the scan data obtained prior to the scan is from a preliminary scan of the sample and/or scans of one or more other samples fabricated to a similar or same design as the sample, or having regions fabricated to similar or same design as regions on the sample.

According to some embodiments, the method further includes:
An initial funneling operation including assigning preliminary scores to each pixel in the sample, or one or more regions of the sample, based on the gaussian approximation of the likelihood ratio test.
For each pixel, whose computed preliminary score is above a threshold score, implementing the operations of computing a parameter D and computing a score q(g, D).

According to some embodiments, the sample is a patterned wafer.

According to some embodiments, the sample is an optical photomask or a reticle used in patterned wafer fabrication.

According to an aspect of some embodiments, there is provided a sample analysis system configured to implement the above-described method.

According to an aspect of some embodiments, there is provided a computerized system for sample analysis (e.g. wafer analysis). The sample analysis system includes scanning equipment and a scan data analysis module. The scanning equipment is configured to obtain scan data of a sample. The scan data analysis module is configured to, for each tested pixel from a plurality of scanned pixels included in the scan data:
Compute a difference vector d based on the scan data and corresponding reference data.
Compute a parameter D, which is dependent on a vector $t=\Gamma d-(G_{linear}/\|\Gamma s\|^2)\Gamma s$. $\Gamma^T\Gamma=K^{-1}$. K is a noise covariance matrix corresponding to the tested pixel. s is a predetermined kernel characterizing a defect signal. $G_{linear}=s \cdot (K^{-1}d)$ is a gaussian approximation of a likelihood ratio test expression for distinguishing the defect signal from the noise. The parameter D substantially monotonically increases with $\|t\|$, at least over a range of values of $\|t\|$ characteristic of sample analysis.
Compute a score q(g, D), which is indicative of a probability of tested the pixel being defective. g is a parameter, which is indicative of a value of $G_{linear}$. q(g, D) is a substantially monotonically increasing function of g and a substantially monotonically decreasing function of D, at least for ranges of values of g and D characteristic of sample analysis.

According to an aspect of some embodiments, there is provided a non-transitory computer-readable storage medium. The storage medium stores instructions that cause a sample analysis system (for example, the computerized system for sample analysis described above) to implement the above-described method.

According to an aspect of some embodiments, there is provided a non-transitory computer-readable storage medium. The storage medium stores instructions that cause a processing circuitry to, based on scan data corresponding to a tested pixel and corresponding reference data:

Compute a difference vector d.

Compute a parameter D, which depends on a vector $t=\Gamma d-(G_{linear}/\|\Gamma s\|^2)\Gamma s$. $\Gamma^T\Gamma=K^{-1}$. K is a noise covariance matrix corresponding to the tested pixel. s is a predetermined kernel characterizing a defect signal. $G_{linear}=s\cdot(K^{-1}d)$ is a gaussian approximation of a likelihood ratio test expression for distinguishing the defect signal from noise. The parameter D substantially monotonically increases with $\|t\|$, at least over a range of values of $\|t\|$ characteristic of sample analysis.

Compute a score q(g, D) indicative of a probability of the tested pixel being defective. g is a parameter indicative of a value of $G_{linear}$. q(g, D) is a substantially monotonically increasing function of g and a substantially monotonically decreasing function of D, at least for ranges of values of g and D characteristic of sample analysis (e.g. wafer analysis).

According to an aspect of some embodiments, there is provided a computer-implemented method for detecting potential defects on a sample (e.g. a wafer). The method includes:

Receiving scan data obtained in a scan of a sample. The scan data corresponds to a tested pixel on the sample.

Computing a difference vector d based on the scan data vector and corresponding reference data.

Checking whether a tip (i.e. endpoint) of Γd is positioned inside a hypervolume defined by a threshold hypersurface corresponding to a threshold T', wherein $\Gamma^T\Gamma=K^{-1}$ with K being a noise covariance matrix corresponding to the tested pixel.

Labeling the tested pixel as defective when the tip of Γd is positioned inside the hypervolume (e.g. within a hyper-cone when threshold hypersurface defines a hyper-cone).

The threshold hypersurface is related to a threshold hyperplane (defined by a gaussian approximation of a likelihood ratio test expression)—characterized by all vectors v satisfying $s_\Gamma \cdot v=T'$, with $s_\Gamma=\Gamma s$ and s being a predetermined kernel including values characterizing a defect signal— through addition to each vector v of a respective vector $w(\|v-(T/s_\Gamma^2)s_\Gamma\|)s_\Gamma$. w is a substantially non-negative, monotonically increasing function, at least for a range of values of its argument characteristic of sample analysis.

According to some embodiments, w is a continuously differentiable function at least for any non-negative or positive value of its argument.

According to some embodiments, w is such that the threshold hypersurface is shaped as a cone centered around $s_\Gamma$.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

Unless specifically stated otherwise, as apparent from the disclosure, it is appreciated that, according to some embodiments, terms such as "processing", "computing", "calculating", "determining", "estimating", "assessing", "gauging" or the like, may refer to the action and/or processes of a computer or computing system, or similar electronic computing device, that manipulate and/or transform data, represented as physical (e.g. electronic) quantities within the computing system's registers and/or memories, into other data similarly represented as physical quantities within the computing system's memories, registers or other such information storage, transmission or display devices.

Embodiments of the present disclosure may include apparatuses for performing the operations herein. The apparatuses may be specially constructed for the desired purposes or may include a general-purpose computer(s) selectively activated or reconfigured by a computer program stored in the computer. Such a computer program may be stored in a computer readable storage medium, such as, but not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a computer system bus.

The processes and displays presented herein are not inherently related to any particular computer or other apparatus. Various general-purpose systems may be used with programs in accordance with the teachings herein, or it may prove convenient to construct a more specialized apparatus to perform the desired method(s). The desired structure(s) for a variety of these systems appear from the description below. In addition, embodiments of the present disclosure are not described with reference to any particular programming language. It will be appreciated that a variety of programming languages may be used to implement the teachings of the present disclosure as described herein.

Aspects of the disclosure may be described in the general context of computer-executable instructions, such as program modules, being executed by a computer. Generally, program modules include routines, programs, objects, components, data structures, and so forth, which perform particular tasks or implement particular abstract data types. Disclosed embodiments may also be practiced in distributed computing environments where tasks are performed by remote processing devices that are linked through a communications network. In a distributed computing environment, program modules may be located in both local and remote computer storage media including memory storage devices.

BRIEF DESCRIPTION OF THE FIGURES

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not drawn to scale. Moreover, two different objects in the same figure may be drawn to different scales. In particular, the scale of some objects may be greatly exaggerated as compared to other objects in the same figure.

In the figures:

FIGS. 9A to 11C present results of simulations demonstrating the utility of the disclosed methods, according to some embodiments thereof.

DETAILED DESCRIPTION

Figure 1:
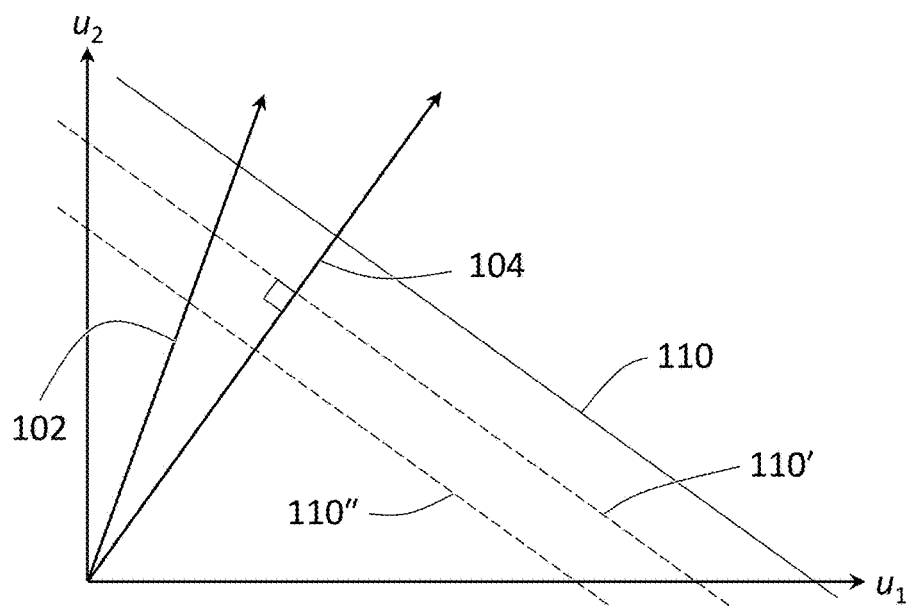
FIG. 1 provides a schematical geometrical representation of likelihood ratio tests for distinguishing signals associated with a defective pixel from noise in the case of a gaussian noise distribution; depicted is a difference vector, corresponding to an event in a two-dimensional probability space, and three decision lines, which optimally partition the probability space for three false alarm rates, respectively, according to prior art.

The principles, uses, and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout.

In the description and claims of the application, the words "include" and "have", and forms thereof, are not limited to members in a list with which the words may be associated.

As used herein, the term "about" may be used to specify a value of a quantity or parameter (e.g. the length of an element) to within a continuous range of values in the neighborhood of (and including) a given (stated) value. According to some embodiments, "about" may specify the value of a parameter to be between 80% and 120% of the given value. For example, the statement "the length of the element is equal to about 1 m" is equivalent to the statement "the length of the element is between 0.8 m and 1.2 m". According to some embodiments, "about" may specify the value of a parameter to be between 90% and 110% of the given value. According to some embodiments, "about" may specify the value of a parameter to be between 95% and 105% of the given value.

As used herein, a first function $f(x)$ may be said to be "substantially equal" to a second function $g(x)$ when $0.8 \cdot f(x) \leq g(x) \leq 1.2 \cdot f(x)$, $0.9 \cdot f(x) \leq g(x) \leq 1.1 \cdot f(x)$, or $0.95 \cdot f(x) \leq g(x) \leq 1.05 \cdot f(x)$, for at least 80%, at least 90%, or at least 95% of a range (particularly a continuous range) of values assumable by x. Similarly, a first multi-variable function $f(x_1, x_2, \ldots, x_n)$ may be said to be "substantially equal" to a second multi-variable function $g(x_1, x_2, \ldots, x_n)$ when $0.8 \cdot f(x_1, x_2, \ldots, x_n) \leq g(x_1, x_2, \ldots, x_n) \leq 1.2 \cdot f(x_1, x_2, \ldots, x_n)$, $0.9 \cdot f(x_1, x_2, \ldots, x_n) \leq g(x_1, x_2, \ldots, x_n) \leq 1.1 \cdot f(x_1, x_2, \ldots, x_n)$, or $0.95 \cdot f(x_1, x_2, \ldots, x_n) \leq g(x_1, x_2, \ldots, x_n) \leq 1.05 \cdot f(x_1, x_2, \ldots, x_n)$, for at least 80%, at least 90%, or at least 95% of each of n continuous ranges of values assumable by $x_1$ to $x_n$, respectively. In particular, "substantial equality" also covers "equality".

According to some embodiments, the first function may represent a parameter (e.g. a physical parameter) or quantity dependent on one or more other parameters or quantities (i.e. the variable(s)), while the second function may represent, for instance, a target (e.g. benchmark) function, an average behavior, or an expected dependence on the one or more other parameters or quantities. According to some embodiments, the range(s) of value(s) of the variable(s)—over which the values assumed by two functions (that are said to substantially equal) agree to within e.g. 20%, 10%, or 5%—may be apparent to the skilled person from the context or the physical settings. For example, if the two functions represent dependencies of pressure on temperature, then the range of values of the temperature is at the very least bounded from below (by the absolute zero), and, more pertinently, may be restricted to a range of temperatures assumable, or typically assumable, under the physical settings.

Further, as used herein, a statement that a parameter or quantity "substantially exhibits" or "substantially follows" a specific type of behavior—that is, a certain form of mathematical dependence (e.g. linear dependence) on one or more variables (i.e. one or more other parameters or quantities)—is to be understood as meaning that the behavior of the parameter or quantity may be described by a first function that is substantially equal to a second function that exhibits the specific type of behavior. Thus, for example, a parameter p "substantially exhibits" linear dependence on a pair of variables x and y when the behavior of p may be described by a function $f(x, y)$, which is substantially equal to a function of the form $a \cdot x + b \cdot y$. Equivalently, it may be said that the parameter p is "substantially equal" to a linear function, and so on.

As used herein, a function may be said to be "substantially monotonically increasing" on a range of values of an argument thereof, when the function monotonically increases over at least 95%, at least 90%, or at least 80% of the range. In particular, a function may be said to be "substantially monotonically increasing" on a range of values of an argument thereof when the function monotonically increases, or strictly monotonically increases, over all of the range. Similarly, a function may be said to be "substantially monotonically decreasing" on a range of values of an argument thereof, when the function monotonically decreases over at least 95%, at least 90%, or at least 80% of the range. In particular, a function may be said to be "substantially monotonically decreasing" on a range of values of an argument thereof when the function monotonically decreases, or strictly monotonically decreases, over all of the range.

As used herein, according to some embodiments, the terms "substantially" and "about" may be interchangeable.

For ease of description, in some of the figures a three-dimensional cartesian coordinate system is introduced. It is noted that the orientation of the coordinate system relative to a depicted object may vary from one figure to another. Further, the symbol ⊙ may be used to represent an axis pointing "out of the page", while the symbol ⊗ may be used to represent an axis pointing "into the page".

Referring to the figures, in block diagrams and flowcharts, optional elements and operations, respectively, may appear within boxes delineated by a dashed line.

Throughout the description, vectors and matrices are represented employing standard mathematical notation, whereby vectors are represented by lowercase, upright letters in boldface (e.g. v), and matrices by uppercase, upright letters in boldface (e.g. M).

The description includes equations. Consequently, to render the description clearer, throughout the description, certain symbols are used exclusively to label specific types of parameters and/or quantities. The vector "d" is reserved for the term "difference vector" and may be used interchangeably therewith. The vector "s" is reserved for the term "predetermined kernel" and may be used interchangeably therewith. The matrix "K" is reserved for the term "covariance matrix" and may be used interchangeably therewith. Thus, the symbols d, s, and K should not be considered as being tied to a specific embodiment with respect to which they are first introduced in the text. That is, specification of properties of these vectors and matrices in the context of one embodiment does not carry over to another embodiment, unless it is implicit from the text that the properties described are general. In particular, in the context of a first embodiment, a "difference vector d" may be introduced, which may then be referred to in the description of the first embodiment as "the difference vector d" or simply "d". Following which, in the context of a second embodiment, a "difference vector d" may again be introduced, and unless, otherwise specified or implicit, no properties described in the context of the first embodiment will be assumed as relevant in the context of the second description.

As used herein, according to some embodiments, the term "image pixel" refers to a picture element characterized by a single gray level value. According to some embodiments, the term "pixel" refers to a subarea on a wafer imaged by a (single) image pixel, and, more generally, any subarea of same dimensions (i.e. such that if the subarea were to be imaged, the image thereof would constitute a single image pixel).

Overview

The likelihood ratio test (LRT) is a criterion in statistics for distinguishing between two hypotheses $H_0$ and $H_1$. $H_0$ and $H_1$ represent two "competing" statistical models characterized by probability distributions $P_0(e|H_0)$ (or simply $P_0(e)$) and $P_1(e|H_1)$ (or simply $P_1(e)$), respectively. The vector e represents an event in probability space. The likelihood ratio $\Lambda(e)$ is given by the ratio of $P_1(e)$ to $P_0(e)$. That is, $\Lambda(e)=P_1(e)/P_0(e)$. According to the LRT, every event e such that $\Lambda(e)<\eta$ is classified under the hypothesis $H_0$, and every event e such that $\Lambda(e)>\eta$ is classified under the hypothesis $H_1$. When $\Lambda(e)=\eta$, the event e may be classified under the hypothesis $H_0$ or the hypothesis $H_1$ (e.g. always $H_0$ or always $H_1$).

The false alarm rate, $P_{FA}=\int_{e|\Lambda(e)>\eta} P_0(e)de$, is the probability that the hypothesis $H_1$ is wrongly accepted (i.e. when the hypothesis $H_0$ is true) based on the LRT. For a given false alarm rate, the LRT maximizes the detection probability—the probability of accepting the hypothesis $H_1$ when true. The threshold $\eta$ may be determined such that a target (i.e. desired) false alarm rate is realized (on average).

In terms of the natural logarithm of the likelihood ratio, the LRT reads: For every event e such that $\ln(\Lambda(e))<\ln(\eta)$, assign e to $H_0$, and for every event e such that $\ln(\Lambda(e))>\ln(\eta)$, assign e to $H_1$. When each of $P_0(e)$ and $P_1(e)$ is a gaussian distribution (i.e. a normal distribution), $\ln(\Lambda(e))$ is linear in e.

In the context of wafer analysis, one of the main tasks is to determine from scan data of a wafer whether pixels thereon are defective. Typically, per each of the pixels a difference vector is first computed from scan data of the pixel (i.e. a set of measured values) and reference data (e.g. scan data of "same" pixels on neighboring dies and/or design data). A difference vector thus corresponds to a specific realization of a random vector. That is, a vector whose components are random variables. More specifically, each component of a difference vector corresponds to a specific realization of a respective random variable, also referred to herein as a "difference variable". Distinct difference vectors (i.e. differing by the values assumed by one or more of their components—also referred to as "difference values"), associated with a pixel, correspond to different events e in probability space.

Given a gaussian noise distribution, the LRT for distinguishing signals associated with a defective pixel from noise may be expressed as: If $h^T \cdot (M^{-1}v) > B$, label the pixel as defective (i.e. hypothesis $H_1$ is accepted), else label the pixel as not being defective (i.e. hypothesis $H_1$ is rejected). v is a difference vector derived from the scan data. M is a covariance matrix associated with the pixel. The covariance matrix M characterizes the noise present in the setup. The noise typically includes shot noise due to pixels with high gray level values as well as speckle noise. In particular, the noise is often hard to distinguish from fluctuations arising from process variations (e.g. variations in the dimensions of a transistor) both in repetitive areas, and especially non-repetitive areas (e.g. random logic areas), on a wafer. The vector h is a predetermined kernel, which represents—up to an overall scale factor—the expected signal pertaining to the pixel when defective, that is, a set of difference values (e.g. a set of differences between measured gray level values and corresponding reference gray level values) that would be obtained—in the absence of noise—if a defect were present. The threshold B equals $\ln(\eta)+c$, wherein c is a constant, and may be predetermined such that a desired the false alarm rate is realized on average.

FIG. 1 provides a geometrical depiction of the LRT in the case of a gaussian noise distribution, according to some embodiments. For simplicity, it is assumed that the difference vector v is two-dimensional, as would be the case, for example, when an intensity of the pixel is compared to two references (e.g. two "same" pixels on adjacent dies). Due to the symmetry and non-singularity thereof, $M^{-1}$ can be re-expressed in terms of a matrix $\Phi$, defined such that $\Phi=^T\Phi=M^{-1}$. (The matrix $J=\Phi^T\Phi$ is the inverse of the covariance matrix M. $\Phi^T$ is the transpose of $\Phi$.) The LRT then reads $h_\Phi \cdot v_\Phi > B$ with $v_\Phi = \Phi_V$ and $h_\Phi = \Phi h$. When the matrix $\Phi$ is applied on a vector of random variables, which are related via the covariance matrix M, the random variables become uncorrelated (i.e. the components of the transformed vector are not correlated). This transformation of random variables is known in the art as a "whitening transformation" (also referred to as a "sphering transformation"). The "whitened" difference vector $v_\Phi$, which is a specific realization of the transformed vector of random variables, is related via the matrix $\Phi$ to the specific realization of the original vector of random variables constituted by the difference vector v. Noting that the predetermined kernel h, may, in principle, also correspond to a specific realization of the original vector of random variables, the vector $h_\Phi$ is referred to herein as a "whitened" predetermined kernel. It is noted that the whitened vectors are unitless.

More specifically, a two-dimensional coordinate system with orthogonal axes $u_1$ and $u_2$ is shown in FIG. 1. Depicted are the "whitened" vectors $v_\Phi$ and $h_\Phi$, which are indicated by arrows 102 and 104, respectively. Also depicted are straight lines 110, 110', and 110", which are parallel to one another and perpendicular to the vector ho. Line 110 corresponds to the threshold B in the sense of being defined by all (whitened difference) vectors u satisfying $h_\Phi \cdot u = B$. Line 110' corresponds to a threshold $B_1 < B$, and therefore to a higher false alarm rate, in the sense of being defined by all vectors u satisfying $h_\Phi \cdot u = B_1$. Line 110" corresponds to a threshold $B_2 < B_1$ in the sense of being defined by all vectors u satisfying $h_\Phi \cdot u = B_2$. Since $B > B_1 > B_2$, the LRT associated with line 110 is the most stringent (i.e. corresponds to the lowest false alarm rate), and the LRT associated with line 110" is the least stringent (i.e. corresponds to the highest false alarm rate).

Thus, in the case of a gaussian noise distribution, the LRT admits a simple geometrical representation in terms of which a difference vector v is labeled as defective if the whitened difference vector $v_\Phi$ intersects (i.e. cuts across) the straight line (also referred to as "decision line") corresponding to the selected threshold, e.g. line 110 when the selected threshold is B. Or, what amounts to the same thing, if $v_\Phi^{(||)}$ intersects line 110, wherein $v_\Phi^{(||)}$ is the projection of the whitened difference vector $v_\Phi$ on the whitened predetermined kernel $h_\Phi$.

When the noise distribution is non-gaussian, as is typically the case in wafer analysis, the likelihood ratio becomes a non-linear function of the difference vector (which may well lack a closed form expression). Nevertheless, the above LRT may be used to approximate the true (or actual) LRT when the noise distribution is sufficiently close to gaussian.

In the gaussian approximation to the LRT (henceforth the "gaussian approximation-based test" or "GA-based test"), only the magnitude of the projection of $v_\Phi$ on $h_\Phi$, $v_\Phi^{(||)} = \|v_\Phi^{(||)}\|$, is taken into account. Thus, any two difference vectors m and n, which point along different directions, but such that the whitened difference vectors $m_\Phi = \Phi m$ and $n_\Phi = \Phi n$ have the same projection on ho (i.e. $m_\Phi^{(||)} = n_\Phi^{(||)}$) will be identically classified.

Figure 2:
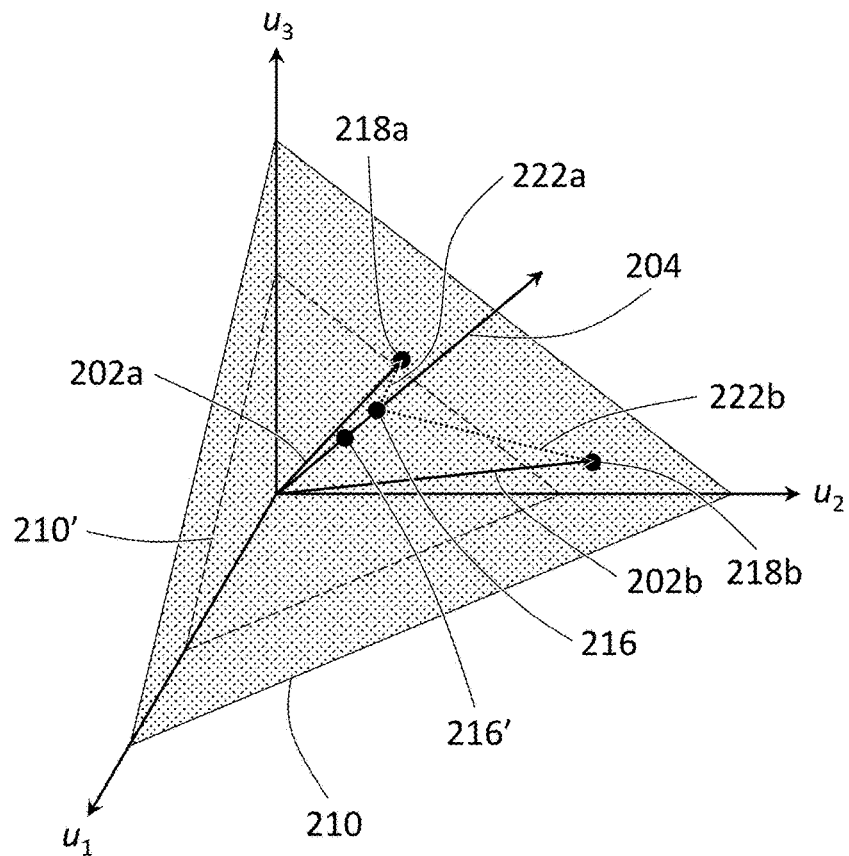
FIG. 2 provides a schematical geometrical representation of two difference vectors, in a three-dimensional probability space; the two vectors are identically classified according to gaussian approximation-based tests.

The situation, described in the preceding paragraph, is illustrated in FIG. 2 in the case wherein the probability space associated with a pixel is three-dimensional. The noise associated with the pixel is characterized by a covariance matrix K. The predetermined kernel associated with the pixel being defective is given by a vector s. The matrix $\Gamma$ is defined via $\Gamma^T\Gamma = K^{-1}$. The whitened predetermined kernel is given by the vector $s_\Gamma = \Gamma s$. Whitened difference vectors $a_\Gamma = \Gamma a$ and $b_\Gamma = \Gamma b$ are indicated by arrows 202a and 202b, respectively. The whitened predetermined kernel $s_\Gamma$ is indicated by an arrow 204. The vector $s_\Gamma$ is perpendicular to a flat plane 210. A point 216 indicates an intersection of arrow 204 and plane 210 (i.e. point 216 lies along arrow 204 and on plane 210). An endpoint 218a of arrow 202a and an end point 218b of arrow 202b each lie on plane 210. This means that each of $a_\Gamma$ and $b_\Gamma$ have the same projection on $s_\Gamma$, namely the vector defined by point 216 (and the origin). Distances from endpoints 218a and 218b to the line defined by $s_\Gamma$ are indicated by (straight) lines 222a and 222b, respectively.

Also indicated is a flat plane 210', corresponding to a threshold T. Each of $a_\Gamma$ and $b_\Gamma$ intersects (decision) plane 210', and, as such, would be classified as defective (or more generally, as potentially defective) under the GA-based test associated with the threshold T.

The magnitude of the whitened predetermined kernel $s_\Gamma$ may be set equal to one without loss of generality, since the threshold T may be accordingly adjusted. To render the description of FIGS. 2-4D less cumbersome mathematically, the predetermined kernels will be assumed to be normalized to one (i.e. $s_\Gamma = \|s_\Gamma\| = 1$). The corresponding general mathematical expressions (that is, without imposing normalization) appear in the Methods subsection, as well as in the Summary.

The inventors have found that in wafer inspection, wherein the noise is non-stationary and non-gaussian, the more "outlying" an event—in the sense of the tip of the whitened difference vector, corresponding thereto, being farther from the axis defined by the whitened predetermined kernel modeling the defect signal (e.g. $s_\Gamma$)—the more likely that the event is due to noise rather than the presence of a defect. More precisely, given an event characterized by a whitened difference vector $d_\Gamma$ satisfying $s_\Gamma \cdot d_\Gamma = c$ (wherein c is a constant)—for sufficiently high values of c—the greater the distance of the tip of $d_\Gamma$ from the axis defined by $s_\Gamma$, the higher the probability that the event is due to noise. This applies not only to repetitive wafer areas but also to non-repetitive patterned wafer areas, such as random logic areas.

In this regard, it is noted that, as compared to repetitive areas, noise in non-repetitive areas may be harder to suppress. This is because comparison of one non-repetitive area to one or more other non-repetitive areas, fabricated to the same design, entails comparison between areas on different dies (e.g. as part of a die-to-die or die-to-multi-die inspection protocol), whereas in the case of a repetitive area, it may be compared to other areas, fabricated to the same design on the same die (e.g. as part of a cell-to-cell or cell-to-multi-cell inspection protocol). Far-apart areas (i.e. on different dies) typically exhibit process variation—a problem that does not arise when comparison between areas on the same die is possible (i.e. when the areas are repetitive). Comparison of areas from different dies thus additionally requires accounting for process variation (which manifests as "color variation", i.e. grey level variations, between scanned images of analogous areas). Advantageously, the higher precision afforded by the methods and systems disclosed herein addresses this problem, thereby facilitating inspection of non-repetitive areas.

More specifically, the noise distribution—the density of events as a function of the coordinates thereof (i.e. the difference values)—typically present in wafer inspection is a mix of gaussian noise and exponential noise in the sense of (i) being essentially gaussian (or at least resembling a gaussian distribution) about the peak of the noise distribution (i.e. wherein the density of events is maximum), and (ii) decaying exponentially at the tails of the noise distribution (wherein the density of events asymptotically tends to zero). The bulk of the noise distribution is gaussian in the sense that an event (a difference vector) is at least two orders (and typically three to four orders) of magnitude more likely to fall under the gaussian part of the noise distribution than under the exponential part thereof. Thus, as compared to gaussian noise, the noise typically present in wafer inspection tends to "fan out" (asymptotically the natural logarithm of the distribution exhibits linear dependence on the magnitude of the noise).

Further, the gaussian part of the noise distribution is narrower than the characteristic magnitude of events associated with the presence of defects. Put another way, events falling under the gaussian part of the noise distribution do not tend to limit detection. In contrast, the events falling under the exponential part of the noise distribution detection-wise tend to be problematic, since they give rise to greater variation between components of a whitened difference vector: For instance, as depicted in FIGS. 9A and 9B in the Results of simulations subsection, the incorporation of an exponential component into the noise distribution gives rise to events due to noise, which are oriented very closely to one of the axes of the whitened probability space, and which nevertheless have large magnitudes. Accordingly, the optimal decision hypersurfaces are commensurately deformed (from the decision hyperplanes of the GA-based test). Results of simulations illustrating this point—and the ensuing advantages to wafer inspection, which, in particular, include attaining higher defect detection rates while maintaining desirably low false alarm rates—are presented in FIGS. 9A and 9B in the Results of simulations subsection.

As an illustrative example, in FIG. 2, endpoint $218b$, which corresponds to the event b, is farther from the axis, defined by $s_\Gamma$, than endpoint $218a$, which corresponds to the event a, and—depending on the magnitude of the deviation from pure gaussian behavior—may more likely result from pure noise rather than the presence of a defect. The present disclosure advantageously teaches how to generalize the GA-based test to allow distinguishing between such difference vectors (e.g. a and b)—in terms of classification—in a generic manner, which is not cumbersome from a computational viewpoint.

In this regard, it is noted that the present disclosure does not require full characterization of the noise present in the sense that beyond the estimation of the covariance matrix K, no further characterization of the noise is required. In particular, the characterization may be limited to the computation of low moments (i.e. second moments) of the probability distribution governing the noise (i.e. the computation of third moments and higher is not required).

More specifically, the present disclosure improves on the GA-based test by, in addition to taking into account $d_\Gamma^{(||)}$ also taking into account $d_\Gamma^{(\perp)}$ (e.g. $a_\Gamma^{(\perp)}$ and $b_\Gamma^{(\perp)}$. $d_\Gamma^{(||)}$ is the projection of a whitened difference vector $d_\Gamma$, which is derived from a difference vector d (i.e. $d_\Gamma=\Gamma d$) associated with a pixel, on the whitened predetermined kernel $s_\Gamma$ associated with the pixel. $d_\Gamma = d_\Gamma^{(||)} \hat{z} + d_\Gamma^{(\perp)} \hat{r}$ with $\hat{z}$ denoting a unit vector along $s_\Gamma$ and $\hat{r}$ denoting a unit vector perpendicular to $s_\Gamma$ on the plane spanned by $d_\Gamma$ and $s_\Gamma$. In this cylindrical coordinate system (or hyper-cylindrical coordinate system when the probability is at least four-dimensional) defined by $s_\Gamma$, $d_\Gamma^{(||)}$ is the height coordinate and $d_\Gamma^{(\perp)}$ is the radial coordinate. $d_\Gamma^{(\perp)}=\sqrt{d_\Gamma^2-(d_\Gamma^{(||)})^2}$ quantifies the distance between the tip (or endpoint) of the whitened difference vector $d_\Gamma$ and the line defined by $s_\Gamma$ (i.e. the distance between the tips of $d_\Gamma$ and $d_\Gamma^{(||)}$). Typically, the greater $d_\Gamma^{(\perp)}$, the less accurate the classification provided by the GA-based test. The present disclosure advantageously teaches how to correct for this effect by introducing a penalty, which increases with $d_\Gamma^{(\perp)}$.

Figure 3A:
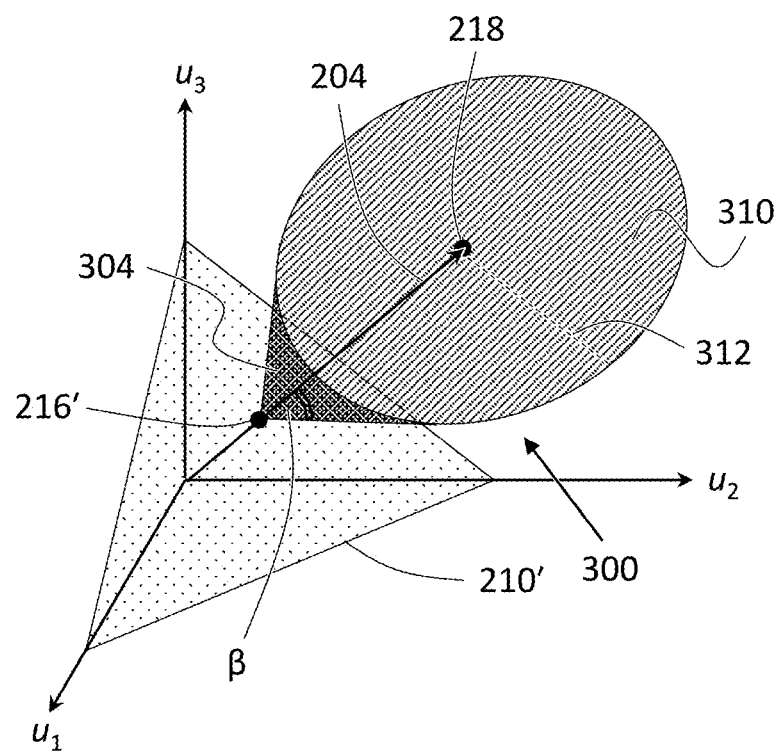
FIG. 3A provides a schematical geometrical representation of a test for distinguishing signals associated with a defective pixel from noise; depicted is a cone-shaped decision surface, according to some specific embodiments of the disclosed methods.

To facilitate the description, a geometrical depiction of specific embodiments of the disclosed methods is presented in FIGS. 3A-4E. A general and detailed exposition of the disclosed methods is presented in the Methods subsection, as well as in the description of computational modules in the Systems subsection. FIG. 3A provides a geometrical depiction of a test for distinguishing signals associated with a defective pixel from noise, according to some embodiments of the disclosed methods. More specifically, depicted is a (right circular) cone 300 in the three-dimensional probability space of FIG. 2. Cone 300 is disposed about arrow 204 (i.e. about $s_\Gamma$), with a longitudinal symmetry axis of cone 300 extending along arrow 204. The apex of the cone is positioned at a point 216' on plane 210', whereat arrow 204 intersects plane 210'. A lateral cross-sectional area of cone 300 increases in the direction defined by arrow 204. Shown is a conical surface 304 and a lateral cross-section 310 of cone 300. (Though not so depicted, cone 300 should be understood as being unbounded. In other words, conical surface 304 should be understood to persist beyond lateral cross-section 310.) An endpoint 218 (i.e. the tip of $s_\Gamma$) lies on the plane defined by lateral cross-section 310. Lateral cross-section 310 defines a circle whose radius is indicated by a straight line 312. Also indicated is an angle $0 \leq \beta < \pi/2$. The aperture angle of cone 300 is $\mu=2\cdot\beta$. An angle $\alpha=\pi/2-\beta$ (not indicated) measures the angular distance from conical surface 304 to plane 210'.

Conical surface 304 is mathematically described by the equation $Q(u)=s_\Gamma \cdot u - \tan(\alpha) \cdot \sqrt{u^2-(s_\Gamma \cdot u)^2}=T$ or, equivalently, since $s_\Gamma=\|s_\Gamma\|=\sqrt{s_\Gamma^2}=1$, $Q(u)=u^{(||)}-\tan(\alpha) \cdot u^{(\perp)}=T$, wherein $u=u^{(||)}\hat{z}+u^{(\perp)}\hat{r}$ and $u=\|u\|=\sqrt{u^2}$. The test associated with the above equation classifies a difference vector d as defective if $Q(u=d_\Gamma) \geq T$ and as non-defective if $Q(u=d_\Gamma)<T$. The magnitude of the second term in the equation increases with the magnitude of u. Due to the negativity thereof, the second term constitutes a penalty, which increases the farther a whitened difference vector (associated with an event) is from the line defined by $s_\Gamma$. In particular, there exist difference vectors d, such that $s_\Gamma \cdot d_\Gamma \geq T$ and at the same time $Q(d_\Gamma)<T$. That is, difference vectors for which $G_{linear}=s_\Gamma \cdot d_\Gamma$ (also referred to as the "GA-based expression") exceeds the threshold T and therefore under the GA-based test would be classified as potentially defective, but which under the disclosed generalization of the GA-based test—i.e. the method disclosed herein—are classified as non-defective. Geometrically-wise, the whitened counterparts of these difference vectors intersect plane 210' but do not intersect conical surface 304 (or, put another way, the tips of the vectors are located outside of cone 300).

Figure 3B:
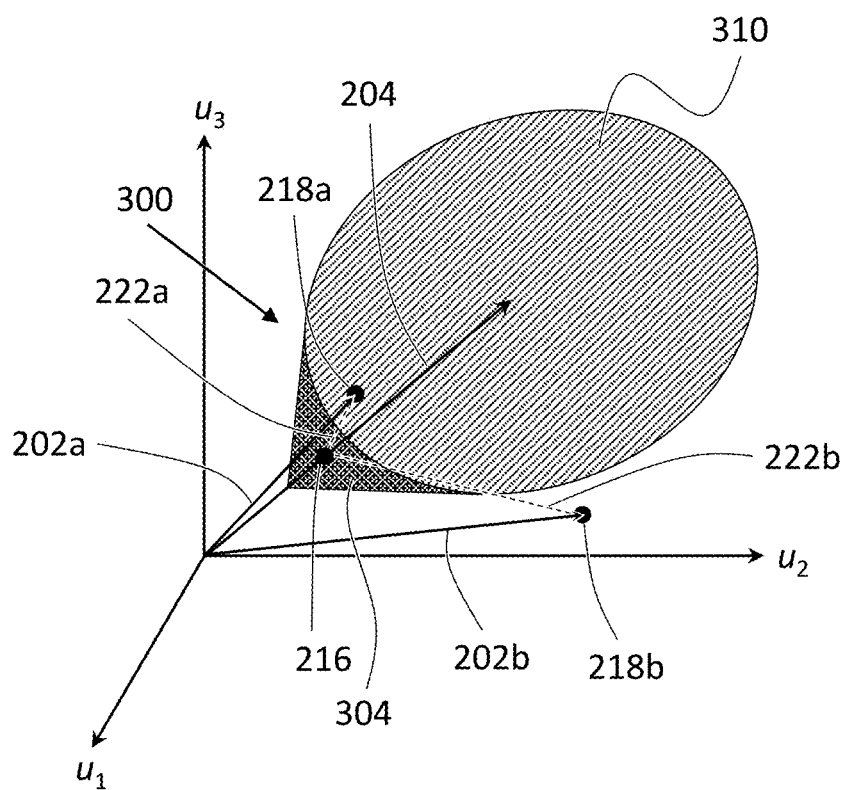
FIG. 3B provides a schematical geometrical representation of the test of FIG. 3A; also depicted are the two difference vectors of FIG. 3A, which are distinguished by the test of FIG. 3A, according to some embodiments specific embodiments of the disclosed methods.

The difference vector b of FIG. 2 (i.e. the difference vector whose whitened form is indicated by arrow $202b$ in FIG. 2)

is an example of such a difference vector. That is, $s_\Gamma \cdot b_\Gamma \geq T$ and at the same time $Q(b_\Gamma) < T$. FIG. 3B depicts the whitened difference vector $b_\Gamma$ (indicated by arrow 202b) together with the whitened difference vector $a_\Gamma$ (indicated by arrow 202a) and cone 300, according to some embodiments. In contrast to the difference vector b, the difference vector a satisfies $Q(a_\Gamma) \geq T$. In other words, the test of FIG. 3A classifies the difference vector a as defective.

The value of β may be selected to maximize the efficacy of the test. The closer the noise distribution is to gaussian, the closer β may be to π/2. When β=π/2 (i.e. α=0) the conical surface reduces to a flat plane (i.e. conical surface 304 reduces to plane 210'), and the test reduces to the gaussian-approximation based test.

It is also noted that the value of the aperture angle may (further) depend on the dimension of the probability space. In particular, according to some embodiments, the addition of references may increase the value of the aperture angle of a hyper-cone (i.e. the generalization of a cone to any dimension and, in particular, n>3 dimensions), whose (hyper-conical) hypersurface constitutes a decision hypersurface in an n-dimensional probability space. Intuitively, this follows from the fact if (i) $C_n$ is a hyper-cone in an n-dimensional space characterized by an aperture angle v, and (ii) $C_m$ is a hyper-cone in an m-dimensional space characterized by an aperture angle v, with n>m, then the relative volume of the n-dimensional space (i.e. the percentage of the space) occupied by $C_n$ is smaller than the relative volume of the m-dimensional space occupied by $C_m$. Hence, in order to keep the probability of missed detections from increasing (or excessively increasing) as the number of references is increased, the hyper-cone aperture angle may accordingly be increased.

Figure 3C:
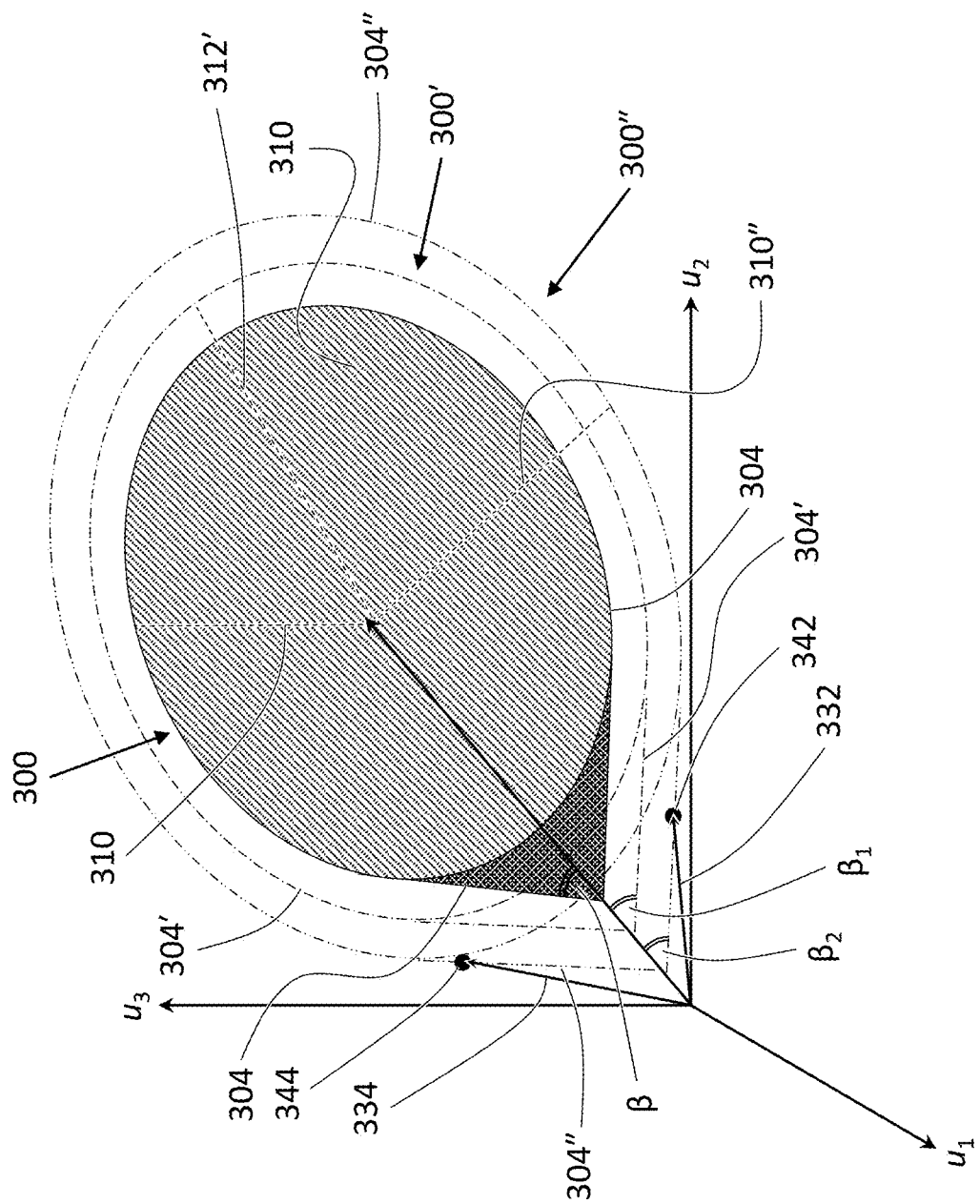
FIG. 3C provides a schematical geometrical representation of three tests for distinguishing signals associated with a defective pixel from noise, depicted are three cone-shaped decision surface, each associated with a respective false alarm rate, according to some specific embodiments of the disclosed methods.

FIG. 3C depicts cone 300 and two additional cones 300' and 300'' corresponding to thresholds $T_1$ and $T_2$, respectively, such that $T_2 < T_1 < T$. Also indicated are angles $\beta_1$ and $\beta_2$. The aperture angle of cone 300' is $\mu_1 = 2 \cdot \beta_1$. The aperture angle of cone 300'' is $\mu_2 = 2 \cdot \beta_2$. According to some embodiments, the aperture angles of the three cones are all equal. According to some embodiments, the aperture angle of cone 300'' is greater than the aperture angle of cone 300', which, in turn, is greater than the aperture angle of cone 300. That is, $\mu_2 > \mu_1 > \mu$ (or equivalently $\beta_2 > \beta_1 > \beta$).

Also indicated in FIG. 3C are conical surfaces 304' and 304'' of cones 300' and 300'', respectively, as well as radii 312' and 312'' of 300' and 300'', respectively, on the plane defined by lateral cross-section 310.

It is noted that the threshold for labeling a pixel as defective or non-defective may also be set "dynamically". According to some embodiments, only a certain number or percentage of all pixels scanned are to undergo review (using higher resolution tools and/or computationally more advanced techniques). More specifically, a predefined budget (i.e. a quota) may be allocated. The budget specifies the number of pixels that are to be reviewed. The budget may be selected such that a target false alarm rate is realized on average. In such embodiments, the (score) function Q(u) may represent a score (i.e. a grade), which is assigned to each scanned pixel (i.e. so that a pixel having a difference vector d is assigned the score $Q(u=d_\Gamma)$). The pixels assigned the highest scores are selected to fill the budget. Since the higher the score assigned to a pixel, the more likely the pixel is in fact defective, the budget includes the pixels that are most likely to be defective. The threshold may thus be set to equal the score of the pixel having the lowest score of all the pixels in the budget (when working under the convention that a pixel may be classified as defective only when the score thereof is greater than, or equal to, the threshold). (Alternatively, when working under the convention that a pixel may be classified as defective only when the score thereof is greater than the threshold, the threshold may be set slightly lower than the score of the pixel having the lowest score of all the pixels in the budget.)

Referring again to FIG. 3C, each of conical surfaces 304, 304', and 304'' represents an equal-score surface. Consequently, any two distinct difference vectors whose tips lie on conical surface 304'' will be assigned the same score. For example, a first whitened difference vector $\Gamma a_1$ and a second difference vector $\Gamma a_2$, indicated by arrows 332 and 334, respectively, have their respective tips positioned on points 342 and 344, which lie on conical surface 304''. Each of the difference vectors $a_1$ and $a_2$ is thus assigned the same score, namely, $T_2 = Q(\Gamma a_1) = Q(\Gamma a_2)$.

Mathematically-wise, the function Q(u) defines a continuum of equal-score surfaces, which are arranged in an increasing score pattern, such that the farther-up along the line, defined by $s_\Gamma$, the intersection-point of an equal-score surface with the line, the greater the score associated with the equal-score surface.

While in FIGS. 3A-3C the decision surfaces are conical, the scope of the disclosure is broader and encompasses other shapes for the decision surfaces (or decision hypersurfaces when the dimension of the probability space is greater than three) corresponding to different functional dependencies of the penalty term on $d_\Gamma^{(\perp)}$. More generally, any function which substantially monotonically increases with $d_\Gamma^{(\perp)}$—at least over a range of values of $d_\Gamma^{(\perp)}$ obtainable in wafer inspection—may be employed. That is, any score function $Q(u) = s_\Gamma \cdot u - p(u^{(\perp)}) = G_{linear} - A(G_{linear}) \cdot p(u^{(\perp)})$, wherein $u^{(\perp)} = \hat{r} \cdot u > 0$, with $u^{(\parallel)} = u^{(\parallel)} \hat{z} + u^{(\perp)} \hat{r}$ (in the cylindrical coordinate system defined by $s_\Gamma$). It is also noted that $G_{linear} = u^{(\parallel)}$, since $s_\Gamma = 1$ (i.e. $\|s_\Gamma\| = 1$). Here p is non-negative and a substantially monotonically increasing function of $u^{(\perp)}$ (which is non-negative), at least over a range of values of $u^{(\perp)}$ obtainable in wafer inspection. A is a positive function, which may further be a substantially monotonically increasing function of $G_{linear}$, at least over a range of values of $G_{linear}$ obtainable in wafer inspection. Referring back to FIG. 3C, the inclusion of the function A accounts for the case wherein $\beta_2 > \beta_1 > \beta$. More precisely, the inclusion of the function A covers the case wherein the density of the equal-score surfaces decreases as $u_\Gamma^{(\perp)}$ increases.

Figure 4A:
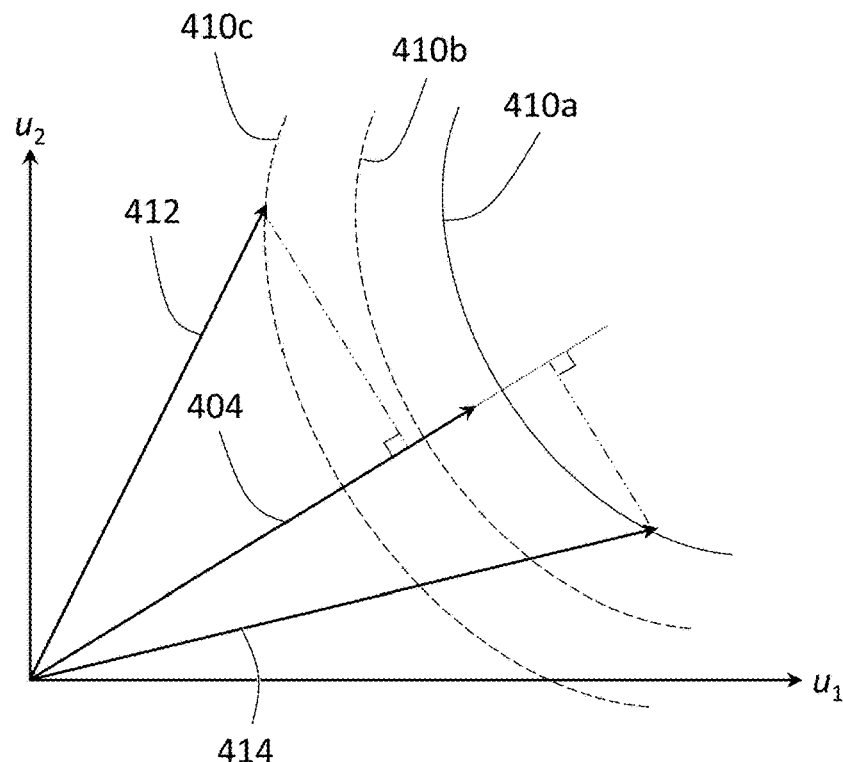
FIGS. 4A to 4E provide schematical geometrical representations of tests for distinguishing signals associated with a defective pixel from noise, according to some specific embodiments of the disclosed methods.

FIG. 4A depicts the score function $Q_A(u) = s_\Gamma \cdot u - c_1 \cdot p_1 (u^{(\perp)}) = G_{linear} - c_1 \cdot p_1 (u^{(\perp)})$, in the case wherein the probability space is two-dimensional, according to some embodiments. Here $c_1$ is a positive constant. $Q_A(u)$ has of the same form as the score function Q(u) of the preceding paragraph, except that the constant $c_1$ is substituted for the function $A(G_{linear})$. Depicted are a whitened predetermined kernel $s_\Gamma$, represented by a (first) arrow 404, and three curved decision lines 410a, 410b, and 410c. Each of the curved decision lines is associated with a respective score (or equivalently threshold). Decision line 410a is associated with a score $S_a$, decision line 410b is associated with a score $S_b$, and decision line 410c is associated with a score $S_c$, with $S_a > S_b > S_c$. Since a term such as $A(G_{near})$ is not included (or, equivalently, set equal to $c_1$), the density of the decisions lines is constant.

Also depicted are a second arrow 412, which represents the whitening of a first difference vector $b_1$, and a third arrow 414, which represents the whitening of second difference vector $b_2$. The endpoint of second arrow 412 lies on decision line 410b so that the score assigned thereto $Q_A(\Gamma b_1)$ is equal to $S_c$. The endpoint of third arrow 414 lies on decision line 410a so that the score assigned $Q_A(\gamma b_2)$ thereto is equal to $S_a$.

Figure 4B:
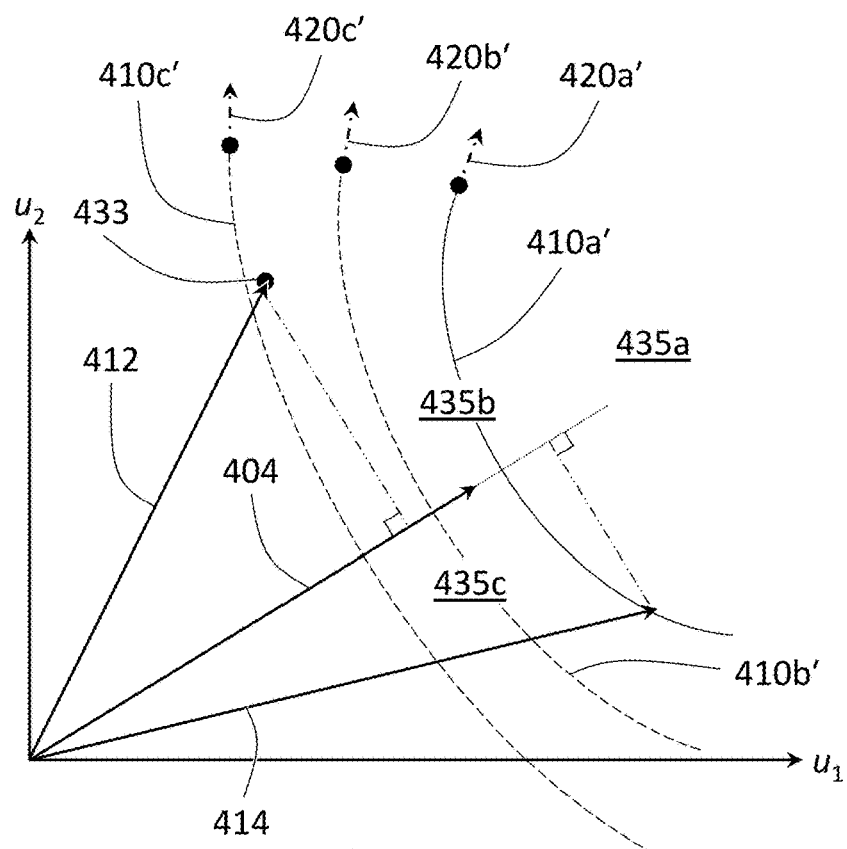

FIG. 4B depicts the score function $Q_B(u) = s_\Gamma \cdot u - A_1(G_{linear}) \cdot p_1(u^{(-1)}) = G_{linear} - A_1(G_{linear}) \cdot p_1(u^{(-1)})$, in the case wherein the probability space is two-dimensional, according to some embodiments. $Q_B(u)$ differs from $Q_A(u)$ in the inclusion of $A_1(G_{linear})$ instead of $c_1$ (or, put another way, in that $A_1(G_{linear})$ is not constant). $A_1(G_{linear})$ is a monotonically increasing function of its argument. The predetermined kernels and the covariance matrices are assumed to be the same in each of FIGS. 4A and 4B. In addition to the whitened predetermined kernel $s_\Gamma$ (indicated by arrow 404), additionally depicted are three curved decision lines 410a', 410b', and 410c'. Decision line 410a' is associated with a score $S_a'$, decision line 410b' is associated with a score $S_b'$, and decision line 410c' is associated with a score $S_c'$, with $S_a' > S_b' > S_c'$. Since $A_1$ is not constant, the density of the decisions lines is does is not constant. More specifically, the density of the decision lines decreases with the distance from the straight line defined by the whitened predetermined kernel $s_\Gamma$, as illustrated by the divergence from one another of arrows 420a', 420b', and 420c'.

Decision line 410a' is shaped identically to decision line 410a, while decisions lines 410b' and 410c' are deformations of decisions lines 410b and 410c, respectively, whereby the decision lines are comparatively less curved. Consequently, an endpoint 433 of second arrow 412 does not lie on decision line 410c' but rather is positioned between decision line 410c' and decision line 410b'. More specifically, endpoint 433 is positioned inside an area 435c delimited by decision line 410c'. Area 435c is defined by all vectors u satisfying $Q_B(u) \geq S_c'$. Similarly, areas 435b and 435a are defined by all vectors satisfying $Q_B(u) \geq S_b'$ and $Q_B(u) \geq S_a'$, respectively. Thus, area 435c includes area 435b, which includes area 435a.

Even more generally, the scope of the disclosure admits any function of the form $Q(u) = q_0(G_{linear}) - A(G_{linear}) \cdot g_1(u_\Gamma^{(-1)})$, wherein $q_0$ is a substantially monotonically increasing function of its arguments (at least for a range of values of $G_{linear}$ obtainable in wafer inspection), $q_1$ exhibits substantially monotonic increasing behavior for non-negative values of its argument (at least for a range of values of $u_\Gamma^{(-1)}$ obtainable in wafer inspection), and A is positive function, which is substantially monotonically increasing. That is, any such function may serve as a score function.

As used herein, the term "orthant" generalizes the notions of "quadrant" and "octant" to n dimensions, wherein $n \geq 2$. In particular, an "orthant" may be used to refer to a quadrant, (i.e. when n=2) or to an octant (i.e. when n=3).

While in the embodiments of FIGS. 3A-4B the respective whitened difference vector is positioned in the positive quadrant or octant, according to other embodiments, a whitened difference vector may be positioned in any orthant.

Figure 4C:
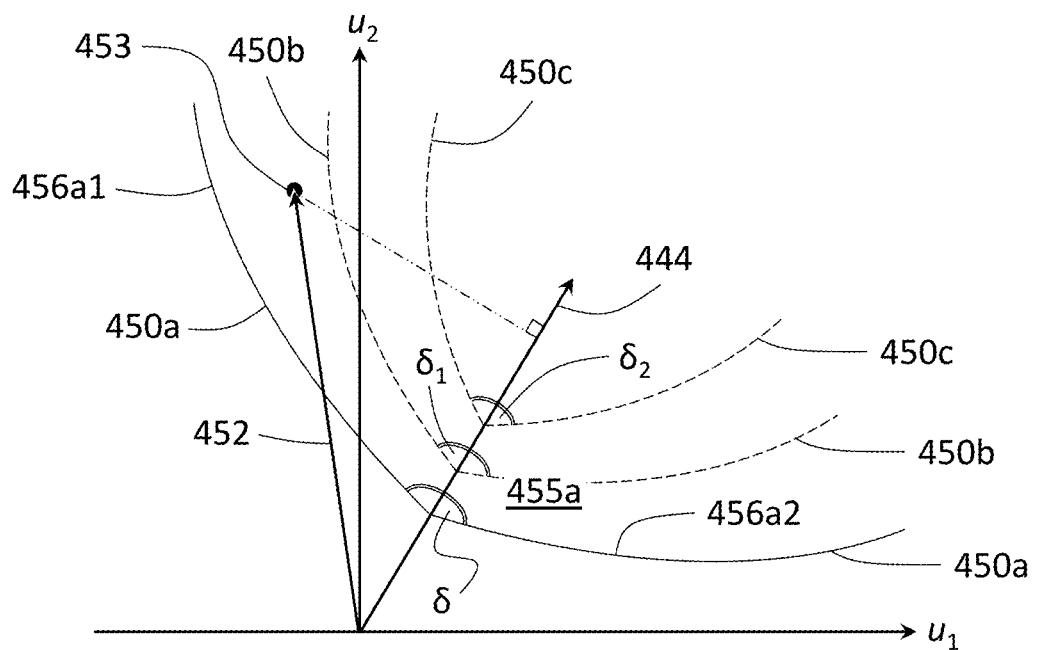

In particular, depending on the setting or scenario, a whitened difference vector need not necessarily be positioned in the same orthant as the whitened predetermined kernel in order to be classified as defective or potentially defective. A non-limiting example of such a scenario, according to some embodiments, is presented in FIG. 4C. More specifically, FIG. 4C depicts a two-component whitened predetermined kernel, which is indicated by an arrow 444, and which is positioned in the first quadrant. Also indicated is a decision curve 450a, and a whitened difference vector, indicated by an arrow 452. The whitened difference vector is positioned in the second quadrant. An endpoint 453 of arrow 452 is positioned inside an area 455a delimited by decision curve 450a—i.e. area 455a is defined by all vectors u whose score is greater, or equal to, than the threshold defined by decision curve 450a. Hence, according to the test, defined by decision curve 450a, the pixel (or a pair of pixels, e.g. when the scan data is of two pixels and the reference data includes one reference for each of the pixels)—with which the whitened difference vector is associated—is (or are) defective or potentially defective.

Decision curve 450a includes a first arm 456a1 and a second arm 456a2, symmetrically disposed on the two sides, respectively, of the whitened predetermined kernel (i.e. arrow 444). Further indicated is an angle $\delta$ spanned between a first arm 456a1 and a second arm 456a2 of decision curve 450a. Put another way, the derivative of decision curve 450a on arrow 444 is undefined (i.e. diverges). Also indicated are angles $\delta_1$ and $\delta_2$ similarly defined by the arms (not numbered) of a decision curve 450b and the arms (not numbered) of a decision curve 450c, respectively. According to some embodiments, and as depicted in FIG. 4C, $\delta > \delta_1 > \delta_2$. According to some other embodiments, $\delta = \delta_1 = \delta_2$.

According to some embodiments, each of the axes $u_1$ and $u_2$ in FIG. 4C quantifies a respective (whitened) difference value associated with a respective reference (e.g. an analogous pixel on a respective reference die). According to some alternative embodiments, each of the axes quantifies a respective (whitened) difference value associated with a respective perspective from a pair of perspectives. According to some other embodiments, each of the axes quantifies a respective (whitened) difference value associated with a respective pixel from a pair of neighboring pixels.

As used herein, the terms "decision line" and "decision curve" may be used interchangeably.

While in the embodiments of FIGS. 3A-4C the respective whitened predetermined kernel is positioned in the positive quadrant or octant, according to other embodiments, a whitened predetermined kernel may be positioned in a negative orthant, and more generally, according to some embodiments, in any orthant.

In particular, components of a predetermined kernel may differ from one another in sign. For example, an m-component predetermined kernel, associated with an m-pixel defect, may have both positive and negative components, due to one or more of the (defective) pixels being characterized by higher gray level values than the respective reference gray level values, and the rest of the (defective) pixels being characterized by lower gray level values than the respective reference gray level values. Similarly, an m-component predetermined kernel, associated with a single defective pixel, wherein each component of the predetermined kernel corresponds to a different perspective, may have both positive and negative components, due to the signals associated with one or more of the perspectives being larger than the respective reference values, and the signals associated with the rest of the perspectives being smaller than the respective reference values.

Figure 4D:
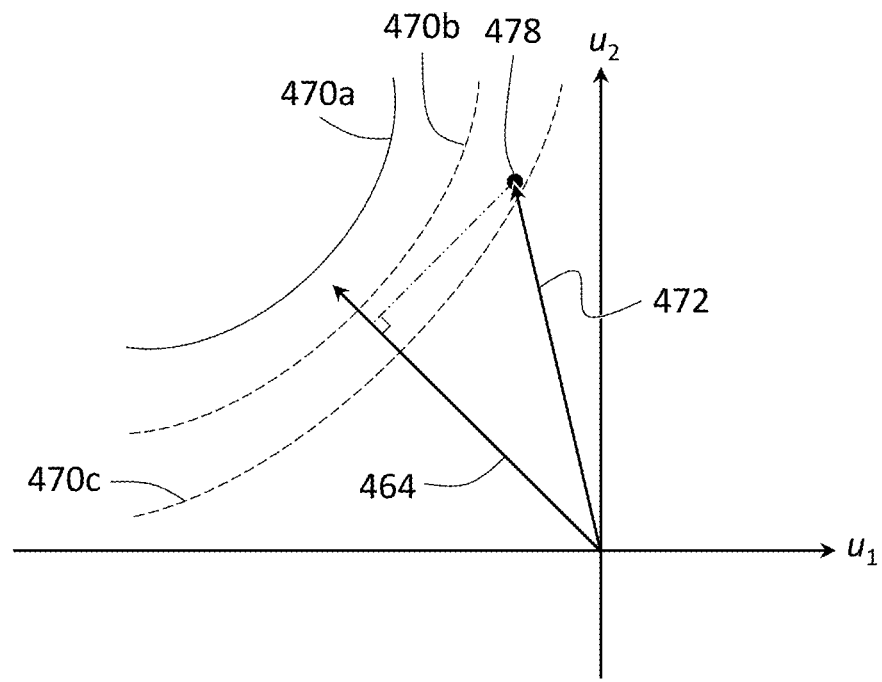

A non-limiting example of such a scenario, according to some embodiments, is presented in FIG. 4D. More specifically, FIG. 4D depicts a two-component whitened predetermined kernel, which is indicated by an arrow 464, and which is positioned in the second quadrant. Also indicated are decision curves 470a, 470b, and 470c, and a whitened difference vector, indicated by an arrow 472. The whitened difference vector is also positioned in the second quadrant. Decision curves 470a, 470b, and 470c correspond to scores $S_a''$, $S_b''$, and $S_c''$, respectively, wherein $S_a'' > S_b'' > S_c''$. An endpoint 478 of arrow 472 is positioned between curves 470*b* and 470*c*. Hence, a score S" of the whitened difference vector is greater than $S_c''$ and smaller than $S_b''$.

According to some embodiments, each of the axes $u_1$ and $u_2$ in FIG. 4D quantifies a respective (whitened) difference value associated with a respective perspective from a pair of perspectives. According to some alternative embodiments, each of the axes quantifies a respective (whitened) difference value associated with a respective pixel from a pair of neighboring pixels.

Figure 4E:
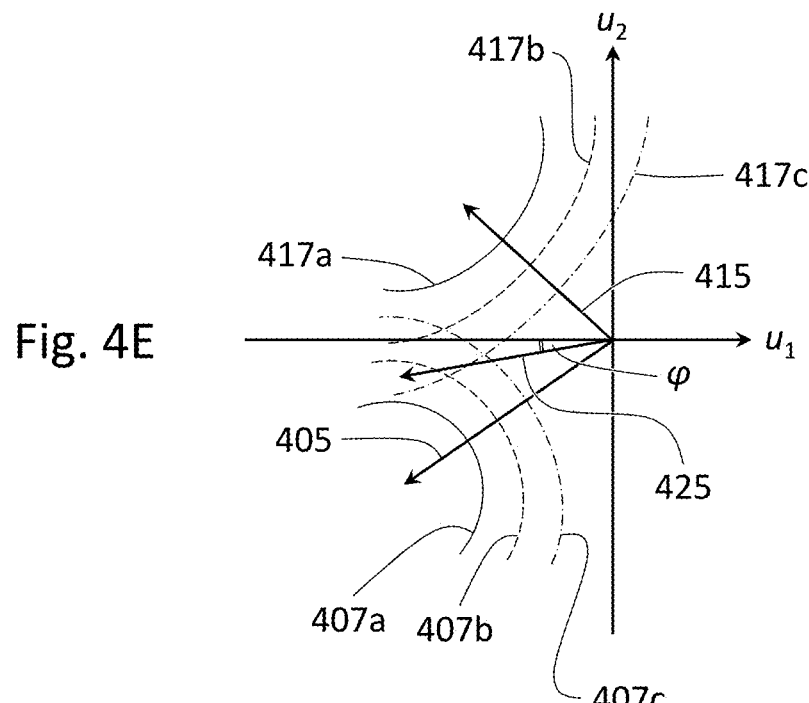

As further elaborated on below, in the Methods subsection, scan data corresponding to a pixel may be tested for the presence of two or more different types of defects. A non-limiting example of such a scenario, according to some embodiments, is presented in FIG. 4E. More specifically, FIG. 4E depicts a first (two-component) whitened predetermined kernel, which is indicated by an arrow 405, and which is positioned in the third quadrant (i.e. the negative quadrant). Also indicated are decision curves 407*a*, 407*b*, and 407*c*, corresponding to the first whitened difference vector and associated with scores $S_a^{iii}$, $S_b^{iii}$, and $S_c^{iii}$, respectively. $S_a^{iii} > S_b^{iii} > S_c^{iii}$. A second (two-component) predetermined kernel, positioned in the second quadrant, is indicated by an arrow 415. Also indicated are decision curves 417*a*, 417*b*, and 417*c*, corresponding to the second whitened difference vector and associated with scores $S_a^{ii}$, $S_b^{ii}$, and $S_c^{ii}$, respectively. $S_a^{ii} > S_b^{ii} > S_c^{ii}$. Finally, a whitened difference vector is indicated by an arrow 425. The whitened difference vector is positioned in the third quadrant at an angle φ relative to the negative horizontal axis (wherein the angle extends anti-clockwise from the negative half of the horizontal axis).

According to the test associated with the first whitened predetermined kernel (i.e. indicated by arrow 405 in the third quadrant), the whitened difference vector is assigned a score $S^{iii}$, which is greater than $S_b^{iii}$ and smaller than $S_a^{iii}$. According to the test associated with the second whitened predetermined kernel (i.e. indicated by arrow 415 in the second quadrant), the whitened difference vector is assigned a score $S^{ii}$, which is greater than $S_c^{ii}$ and smaller than $S_b^{ii}$. According to some embodiments, the score functions associated with the predetermined kernels may be so normalized (i.e. relatively scaled), such that: (i) if $S^{iii}$ is sufficiently greater than $S^{ii}$, the scan data corresponding to the pixel may be diagnosed as exhibiting, or potentially exhibiting, the first type of defect, and (ii) if $S^{ii}$ is sufficiently greater than $S^{iii}$, the scan data corresponding to the pixel may be diagnosed as exhibiting, or potentially exhibiting, the second type of defect. Otherwise, the diagnosis of the type of defect (if at all present) may be deferred to a higher-resolution technique or tool.

More generally, scan data corresponding to a pixel may be tested for the presence of different types of defects, whose corresponding whitened predetermined kernels, in principle, may be positioned in any one of the orthants. Further, two or more different types of defects may be associated with whitened predetermined kernels (or whitened predetermined kernels), respectively, which may be positioned in the same orthant.

As used herein, according to some embodiments, two dies along a die-column may be said to be "neighbors" when adjacent, or separated by one die, two dies, three dies, or even five dies. Each possibility corresponds to separate embodiments.

Systems

Figure 5:
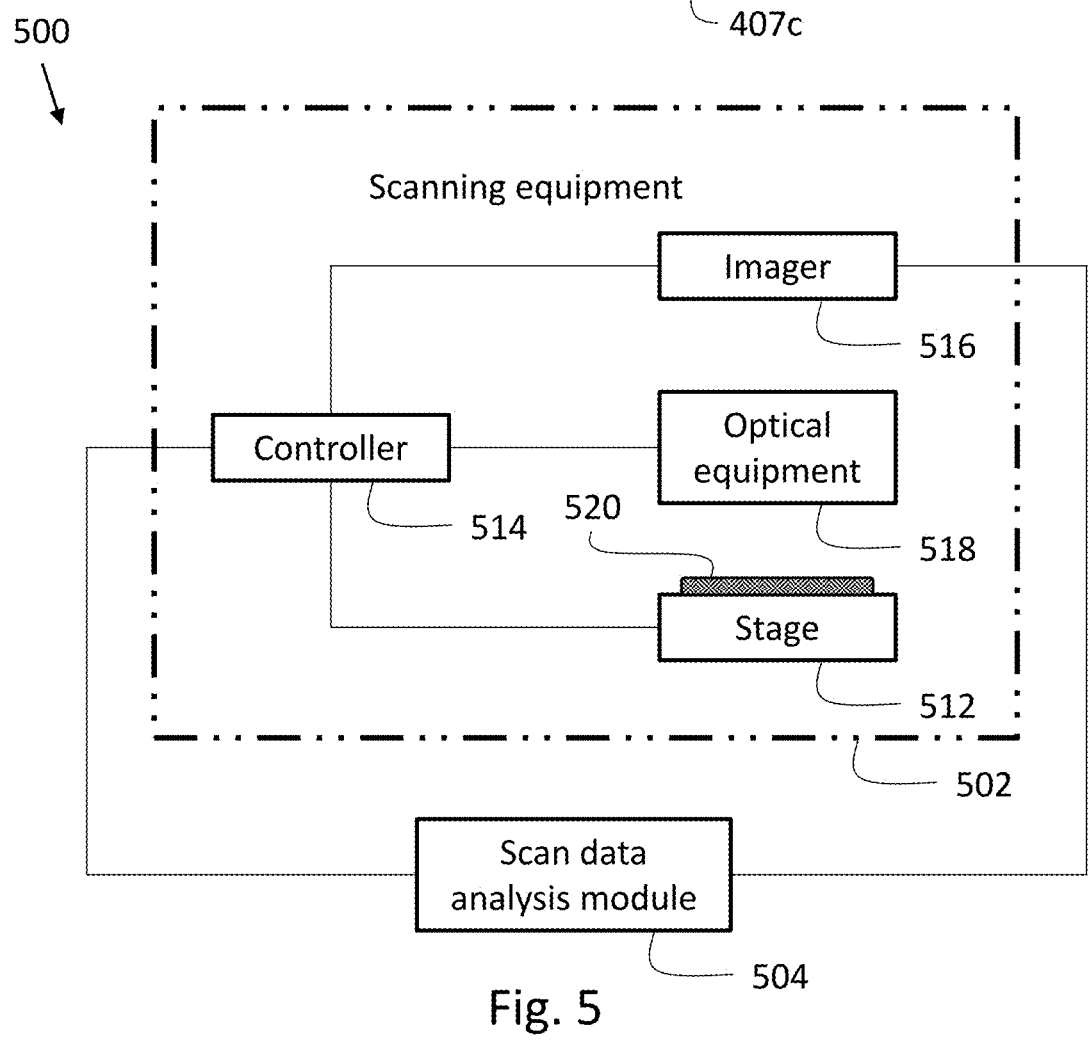
FIG. 5 presents a block diagram of a computerized system for obtaining and analyzing scan data of a wafer (also depicted), according to some embodiments.

According to an aspect of some embodiments, there is provided a computerized system for obtaining and analyzing scan data of a wafer. FIG. 5 is a block diagram of such a computerized system, a computerized system 500, according to some embodiments. System 500 includes scanning equipment 502 and a scan data analysis module 504.

Scanning equipment 502 is configured to scan a wafer (or an optical mask). According to some embodiments, scanning equipment may be configured to scan the wafer in two or more perspectives, as elaborated on below. Scan data analysis module 504 is configured to receive scan data obtained by scanning equipment 502, and to analyze the scan data, as elaborated on below and in the description of FIGS. 7 and 8. In particular, system 500 is configured to implement the method of FIG. 8 with scan data analysis module 504 being configured to implement the method of FIG. 7.

According to some embodiments, scanning equipment 502 includes a stage 512, a controller 514, an imager 516 (imaging device), and optical equipment 518. Scanning equipment 502 is delineated by a dashed-double-dotted box to indicate that components therein (e.g. stage 512 and imager 516) may be separate from one another, e.g. in the sense of not being included in a common housing.

Stage 512 is configured to have placed thereon a wafer to be inspected, such as a patterned wafer 520. Wafer 520 may include repetitive patterns (within a die) thereon and/or non-repetitive patterns (within a die, e.g. random logic areas within a die). According to some embodiments, stage 512 may be moveable, as elaborated on below. Imager 516 may include one or more light emitters (e.g. a visible and/or ultraviolet light source) configured to irradiate wafer 520. Further, imager 516 may include one or more light detectors configured to convert light returned from wafer 520 into an electrical current or voltage signal. In particular, imager 516 may apply collection techniques, including brightfield collection, grayfield collection, and the like. Optical equipment 518 may include optical filters (e.g. spatial filters, polarizing filters, Fourier filters), beam splitters (e.g. polarizing beam splitters), mirrors, lenses, prisms, grids, deflectors, reflectors, apertures, and/or the like, as known in the art of wafer inspection.

According to some embodiments, optical equipment 518 may include any arrangement of optical components configured to determine (i.e. to set) one or more optical properties (such as shape, spread, polarization) of a radiation beam(s), from a radiation source of imager 516, which is incident on wafer 520. According to some embodiments, optical equipment 518 may further include any arrangement of optical components configured to select (e.g. by filtering) one or more optical properties of a returned radiation beam(s) (e.g. a beam(s) specularly reflected by, or diffusely scattered off of, wafer 520) prior to the detection thereof. According to some embodiments, optical equipment 518 may further include optical components configured to direct the returned radiation beam(s) towards the detectors of imager 516.

Controller 514 may be functionally associated with stage 512, imager 516, and optical equipment 518, as well as with scan data analysis module 504. More specifically, controller 514 is configured to control and synchronize operations and functions of the above-listed modules and components during scanning of a wafer. For example, stage 512 is configured to support an inspected wafer, such as wafer 520, and to mechanically translate the inspected wafer along a trajectory set by controller 514, which also controls imager 516.

Figure 6:
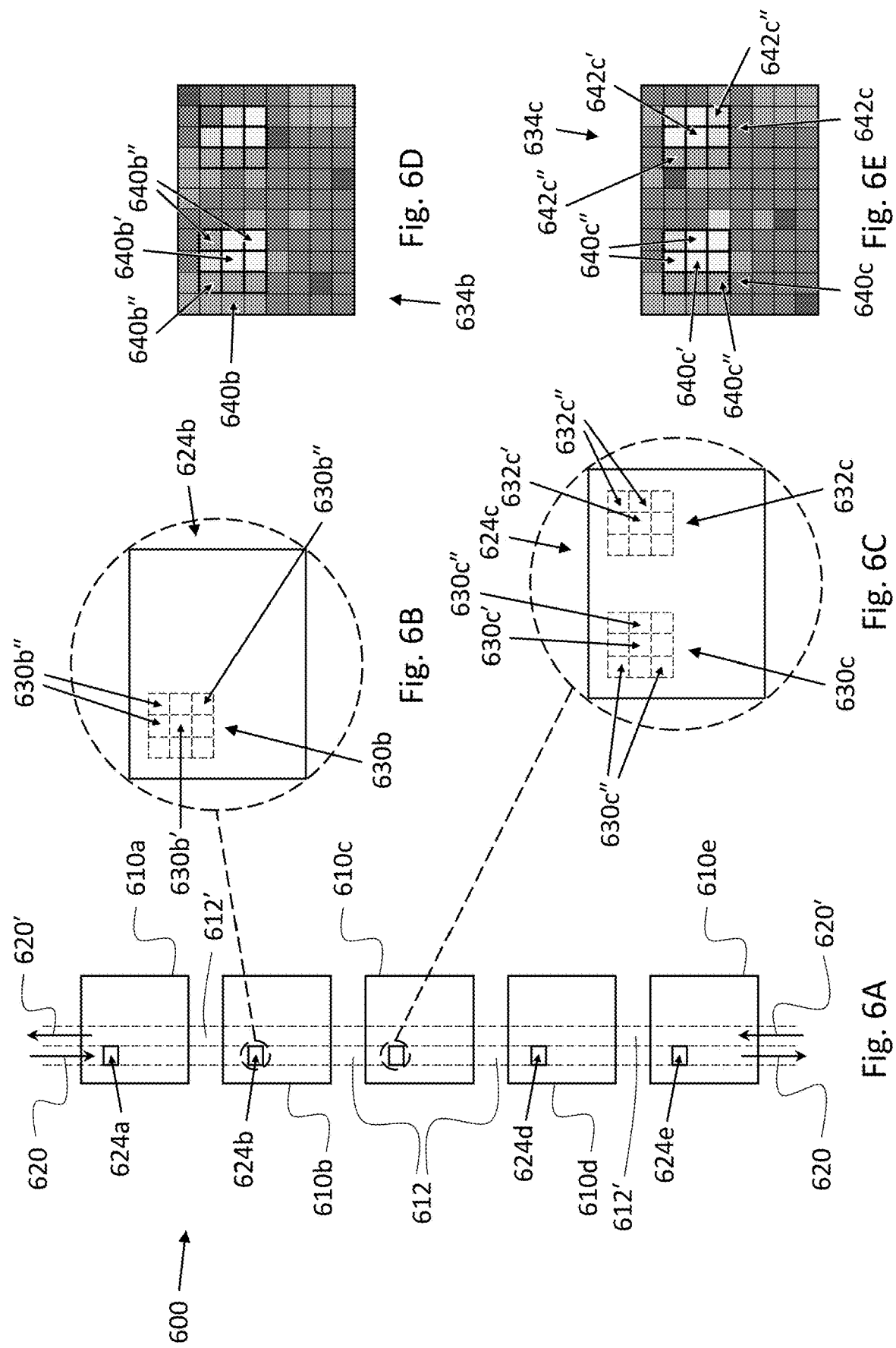
FIG. 6A presents a plurality of consecutive dies along a die-column on a wafer, according to some embodiments.
FIGS. 6B and 6C present a pair of corresponding segments, respectively, along a slice on the die-column of FIG. 6A, according to some embodiments.
FIGS. 6D and 6E present image frames of corresponding segments, respectively, along a slice on the die-column of FIG. 6A according to some embodiments.

To render the description of more concrete, reference is made to FIGS. 6A-6E. FIG. 6A schematically depicts a plurality of consecutive dies 610 (as a non-liming example, five in FIG. 6A) in a die-column 600 on wafer 520, according to some embodiments. Depicted are a first die 610*a* (the topmost of dies 610), a second die 610*b*, a third die 610*c*, a fourth die 610*d*, and a fifth die 610*e* (the bottommost of dies 610). Second die 610*b* is positioned between first die 610*a* and third die 610*c*. Third die 610*c* is positioned between second die 610*b* and fourth die 610*d*. Fourth die 610*d* is positioned between third die 610*c* and fifth die 610*e*. A slice 612 longitudinally extends along die-column 600 and represents a scanning path therethrough (e.g. from top-to-bottom, as indicated by arrows 620) in a wafer scanning protocol implemented by a computerized system, such as system 500. That is, slice 612 corresponds in width to the x-dimension of a field-of-view (FOV) of an imager, such as imager 516. Further indicated is a slice 612', which is adjacent to slice 612, Accordingly slice 612' may be scanned in an opposite direction to the scanning direction of slice 612 (e.g. from bottom-to-top, as indicated by arrows 620').

Also indicated are segments 624 positioned along slice 612 (i.e. segments of slice 612, which have the same width as slice 612). Each of segments 624 is positioned within one of dies 610, respectively. Segments 624 correspond to one another in sense of—up to manufacturing imperfections and/or setup imperfections—having the same dimensions and covering analogous areas, respectively, within dies 610. That is, in the absence of any imperfections, segments 624 would be identical. With each of segments 624 a respective image frame may be associated, which is "captured" by imager 516, as described below.

FIGS. 6B and 6C provide enlarged views of two of segments 624, according to some embodiments: a segment 624*b* (depicted in FIG. 6B) and a segment 624*c* (depicted in FIG. 6C). Indicated in segment 624*b* is a group of pixels 630*b* including a central pixel 630*b'* and neighboring pixels 630*b"* (eight, as a non-limiting example, in FIG. 6B; not all of which are numbered), which surround central pixel 630*b'*. Indicated in segment 624*c* is a group of pixels 630*c* including a central pixel 630*c'* and neighboring pixels 630*c"* (eight, as a non-limiting example, in FIG. 6C; not all of which are numbered), which surround central pixel 630*c'*. Also indicated in segment 624*c* is a group of pixels 632*c* including a central pixel 632*c'* and neighboring pixels 632*c"*, which surround central pixel 632*c'*.

FIG. 6D depicts an image frame 634*b* of segment 624*b*, according to some embodiments. That is, image frame 634*b* is a scanned image of segment 624*b*. Also depicted is a group of image pixels 640*b* pertaining to group of pixels 630*b*. Image pixels 640*b* include a central image pixel 640*b'* (pertaining to central pixel 630*b*) and neighboring image pixels 640*b"* (pertaining to neighboring pixels 630*b"*). FIG. 6E depicts an image frame 634*c* of segment 624*c*, according to some embodiments. Also depicted is a group of image pixels 640*c* pertaining to group of pixels 630*c*. Image pixels 640*c* and include a central image pixel 640*c'* (pertaining to central pixel 630*c'*) and neighboring image pixels 640*c"* (pertaining to neighboring pixels 630*c"*).

As used herein, a first pixel may be said to be "analogous" to a second pixel when—were it not for any fabrication imperfections—the first pixel and the second pixel would cover identical subareas within a first structure (e.g. a die or a cell) and a second structure, respectively, which are fabricated to the same design. For example, central pixel 630*b'* and central pixel 630*c'* are analogous, being identically positioned and covering identical subareas—up to fabrication imperfections—within second die 610*b* and third die 610*c*, respectively, and more specifically, within segment 624*b* and 624*c*, respectively. Similarly, a plurality of pixels may be said to be "analogous" when the above definition holds with respect to any pair of pixels in the plurality. For example, group of pixels 630*b* and 630*c* are analogous. As yet another example, group of pixels 630*c* and 632*c* are analogous. Each of group of pixels 630*c* and 632*c* constitutes a respective cell with segment 624*c*, which are analogous to one another.

Further, two image pixels may be said to be "analogous" to one another when—up to scanning, image processing, and registration imperfections—they pertain to analogous pixels. For example, central image pixel 640*b'* and central image pixel 640*c'* are analogous (since central image pixel 640*b'* pertains to central pixel 630*b'*, central image pixel 640*c'* pertains to central pixel 630*c'*, and central pixel 630*b'* and central pixel 630*c'* are analogous). Similarly, a plurality of image pixels may be said to be "analogous" when the above definition holds with respect to any pair of analogous image pixels in the plurality. For example, group of image pixels 640*c* and a group of image pixels 642*c* (which pertain to group of pixels 632*c*) are analogous to one another, constituting images of analogous cells. (Image pixels 642*c* and include a central image pixel 642*c'*, which is analogous to image pixel 640*c'*, and neighboring image pixels 642*c"*, which are analogous to image pixel 640*c"*.)

Referring again to FIG. 5, scan data analysis module 504 includes computer hardware (one or more processors, such as image and/or graphics processor units, and volatile as well as non-volatile memory components; not shown). The computer hardware is configured to analyze scan data, received from imager 516, of one or more pixels on a wafer, such as wafer 520, for presence of defects, as described below.

Scan data analysis module 504 may further include an analog-to-digital (signal) converter (ADC) and a frame grabber (not shown). The ADC may be configured to receive analog image signals from imager 516. The ADC may further be configured to convert the analog image signals into digital image signals and to transmit the digital image signals to the frame grabber. The frame grabber may be configured to obtain from the digital image signals, digital images (block images or image frames) of segments (e.g. segments 624) on a scanned wafer (e.g. wafer 520). The frame grabber may be further configured to transmit the digital images to one or more of the processors and/or memory components. In particular, according to some embodiments, the frame grabber may be configured to transmit the digital images to an image pre-processing module (not shown; included in scan data analysis module 504). The image pre-processing module may be configured to suppress noise in an image frame, adjust brightness of different parts of an image frame, crop an image frame, correct or account for overlap between image frames, and so on. The pre-processed image frames may then be analyzed for the presence of defects, as described below.

More specifically, scan data analysis module 504 may be configured to, per each scanned pixel (e.g. central image pixel 630*c'*):
  Generate a difference vector, based on the scan data, corresponding to the pixel, and corresponding reference data.
  Compute a score indicative of whether the pixel is defective based on the difference vector, and a covariance matrix and a predetermined kernel, which correspond to the pixel.

According to some embodiments, the scan data may be of a tested pixel (e.g. central pixel 630*c'*). According to some embodiments, scan data analysis module 504 may be configured to implement a die-to-die (D2D) analysis, wherein the reference data are of a second (scanned) pixel (e.g.

central pixel 630b') analogous to the tested pixel (e.g. central pixel 630c'). According to some embodiments, scan data analysis module 504 may be configured to implement a die-to-multi-die (D2MD) analysis, wherein the reference data are of a plurality of (scanned) pixels (e.g. central pixel 630b' and a pixel analogous thereto on segment 624d), which are analogous to one another and to the tested pixel (e.g. central pixel 630c').

According to some such embodiments, the plurality of pixels may include two pixels, e.g. on two dies, respectively, along a die-column (e.g. die-column 600). Each of the two dies (e.g. second die 610b and fourth die 610d, first die 610a and second die 610b, or second die 610a and fifth die 610c) is positioned proximately to a tested die (e.g. third die 610c), whereon the tested pixel is positioned. As used herein, according to some embodiments, a die may be referred to as a "tested die" even when only a single pixel thereon is tested as part of a wafer inspection protocol. According to some embodiments, the plurality of pixels may include three pixels, e.g. on three dies, respectively, along a die-column (e.g. die-column 600). According to some embodiments, the plurality of pixels may include four pixels, e.g. on four dies, respectively, along a die-column (e.g. die-column 600). A first pair of the four dies (e.g. first die 610a and second die 610b) may neighbor from above the tested die (e.g. third die 610c), such that a first die in the pair is adjacent from above to the tested die, and a second die in the pair is adjacent from above to the first die in the pair. A second pair of the four dies (e.g. fourth die 610d and fifth die 610c) may neighbor from below the tested die, such that a first die in the pair is adjacent from below to the tested die, and a second die in the pair is adjacent from below to the first die in the pair. Similarly, according to some embodiments, the plurality of pixels may include five, six, seven, eight, nine, ten, or even more than ten pixels, e.g. on five, six, seven, eight, nine, ten, or even more than ten dies, respectively, along a die-column. The number of dies is in principle not limited.

According to some embodiments, the scan data may be of a (first) group of (scanned) pixels (e.g. group of pixels 630c). According to some embodiments, scan data analysis module 504 may be configured to implement a D2D analysis, wherein the reference data are of a second group of (scanned) pixels (e.g. group of pixels 630b), each of which is analogous to a respective pixel in the first group of pixels (e.g. group of pixels 630c). According to some embodiments, scan data analysis module 504 may be configured to implement a D2MD analysis, wherein the reference data are of a plurality of groups of (scanned) pixels. Each pixel in the first group (e.g. group of pixels 630c) is analogous to a respective pixel in each of the scanned groups in the plurality (e.g. group of pixels 630b and a group of pixels on segment 624d, each of which is analogous to a respective pixel in group of pixels 630c).

According to some such embodiments, the plurality of groups of pixels may include two groups of pixels, e.g. on two dies, respectively, along a die-column (e.g. die-column 600). Each of the two dies (e.g. second die 610b and fourth die 610d) is adjacent to a tested die (e.g. third die 610c), whereon the first group of pixels is positioned. According to some embodiments, the plurality of groups pixels may include four groups of pixels, e.g. on four dies, respectively, along a die-column (e.g. die-column 600). A first pair of the four dies (e.g. first die 610a and second die 610b) may neighbor from above the tested die (e.g. third die 610c), such that a first die in the pair is adjacent from above to the tested die, and a second die in the pair is adjacent from above to the first die in the pair. A second pair of the four dies (e.g. fourth die 610d and fifth die 610c) may neighbor from below the tested die, such that a first die in the pair is adjacent from below to the tested die, and a second die in the pair is adjacent from below to the first die in the pair. Similarly, according to some embodiments, the plurality of groups of pixels may include five, six, seven, eight, nine, ten, or even more than ten groups of pixels, e.g. on five, six, seven, eight, nine, ten, or more than ten dies, respectively, along a die-column.

It should be noted that while in FIG. 6A, the slices (e.g. slices 612 and 612') are depicted as straight, the scope of the disclosure is not limited to straight scanning paths, or slice-by-(adjacent) slice coverage. In particular, the scope of the disclosure covers any suitable scanning path (which may be predefined), including also curved scanning paths, as is the case, for example, in spiral scanning in R-Theta stages.

Further, the scope of the disclosure also covers the case, wherein the reference data (in multi-reference embodiments) include scan data from one or more analogous areas on slices along other die-columns. More specifically, in a D2MD (or D2D) inspection (e.g. when inspecting a non-repetitive region of a die), the analogous areas may include analogous areas from adjacent die-columns, or even farther die-columns (e.g. next to adjacent).

According to some embodiments, the scan data may be or include design data. According to some embodiments, the scan data may be multi-perspective scan data.

According to some embodiments, and as described below in the description of FIG. 8, the covariance matrices and the predetermined kernels (when non-trivial, i.e. when the scan data include scan data of a plurality of pixels) may be evaluated prior to the scan and may be stored in a memory of scan data analysis module 504, and/or in an otherwise accessible memory.

According to some embodiments, and as described below in the description of FIG. 8, the covariance matrices and the predetermined kernels may be computed in runtime (by scan data analysis module 504), based on scan data obtained during the scan, and, optionally, also data obtained (and, optionally processed) prior to the scan (e.g. in a preliminary scan or in the scanning of or more wafers fabricated to the same design as the currently scanned wafer).

According to some embodiments, the computation of scores of the pixels may be performed in real-time or near real-time during the scan. According to some embodiments, wherein system 500 is configured to implement a D2D wafer inspection protocol, scan data of a segment along a presently scanned slice in a last scanned die (i.e. before the present die), which corresponds to a presently scanned segment, may be maintained in a volatile memory of scan data analysis module 504 and erased when the scores of the pixels in the presently scanned segment are computed and saved (or progressively erased as the scores of the pixels in the presently scanned segment are computed and saved).

According to some embodiments, wherein system 500 is configured to implement a D2MD wafer inspection protocol, scan data of a plurality of segments along a presently scanned slice in a group of n last scanned dies, which corresponds to a presently scanned segment, may be maintained in a volatile memory of scan data analysis module 504. The scan data of the earliest scanned segment in the plurality of segments may be erased once the scores of the pixels in the presently scanned segment are computed and saved (or progressively erased as the scores of the pixels in the presently scanned segment are computed and saved).

According to some embodiments, wherein system 500 is configured to implement a D2MD wafer inspection protocol, the computation of the scores of pixels in a given segment in a given die along a presently scanned slice may be delayed until scan data of one or more segments in one or more next-to-be-scanned dies is obtained. The scan data of segments, along the presently scanned slice, in the given die, as well as scan data of one or more earlier scanned segments, along the presently scanned slice, in one or more dies scanned prior to the given die, may be maintained in a volatile memory of scan data analysis module 504. Once the scores of the pixels in the given segment are computed and saved, the scan data of the earliest scanned segment, of the one or more earlier scanned segments, may be erased (or progressively erased as the scores of the pixels in the given segment are computed and saved).

Details whereby scan data analysis module 504 computes the score of a pixel are provided in the description of FIGS. 7 and 8 in the Methods subsection below.

Methods

Figure 7:
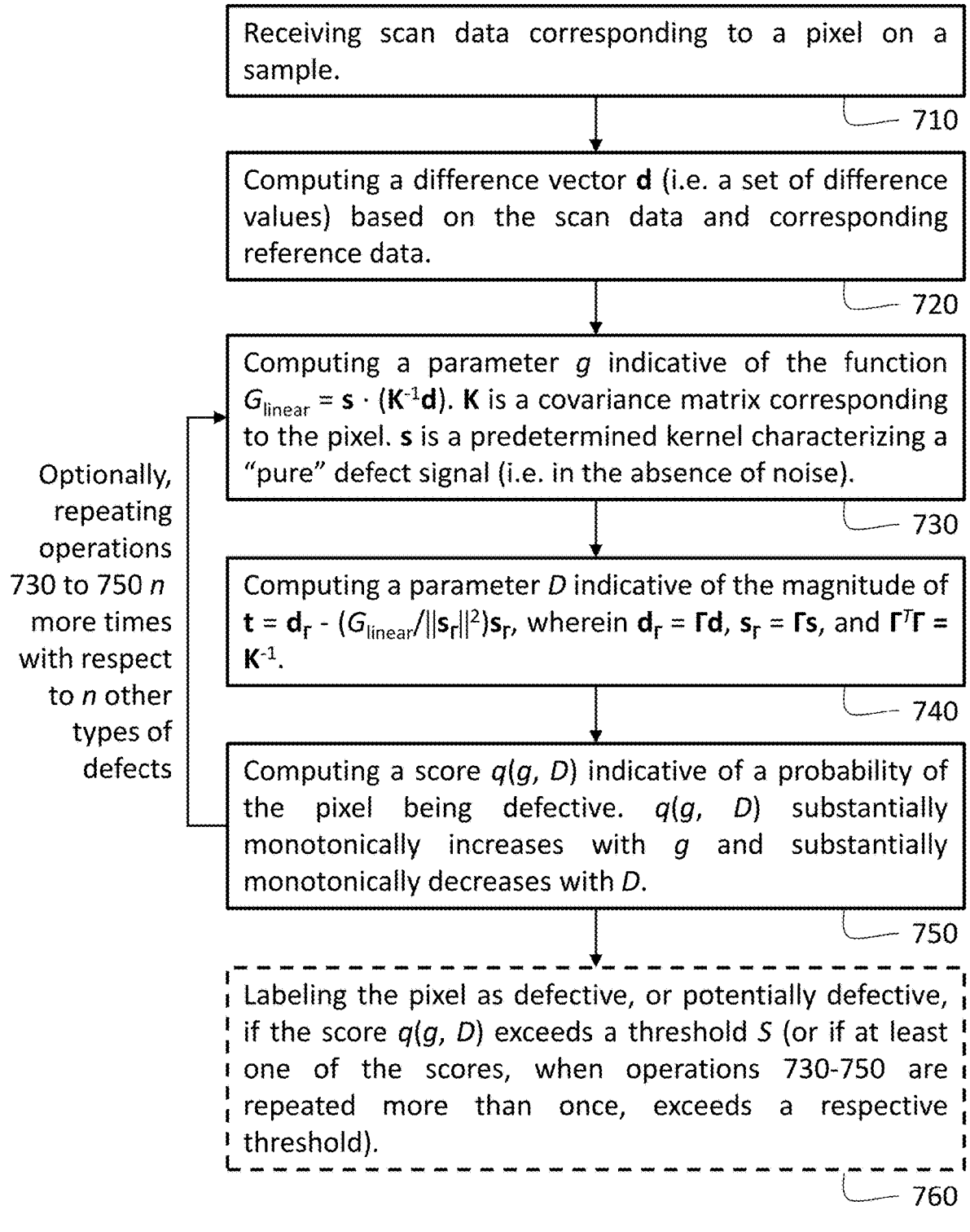
FIG. 7 presents a flowchart of a method of analyzing wafer scan data to detect potential defects, according to some embodiments.

FIG. 7 presents a flowchart of a computerized method 700 for determining whether one or more pixels on a patterned wafer are defective, or potentially defective, based on scan data thereof, according to some embodiments. Method 700 may include operations of:

An operation 710 wherein scan data, obtained in a scan of a wafer (e.g. wafer 520), is received. The scan data corresponds to a tested pixel (e.g. pixel 630c') on the wafer.

An operation 720 wherein a difference vector d (i.e. a set of difference values) is computed based on the scan data and corresponding reference data.

An operation 730 wherein a parameter g, which is indicative of a function $G_{linear} = s \cdot (K^{-1} d)$, is computed. Here, s is a predetermined kernel characterizing a wafer defect signal (e.g. a vector including expected difference values, associated with the tested pixel being defective, in the absence of noise, up to an overall scale factor). K is a covariance matrix (also referred to as a "noise covariance matrix") including noise values (i.e. variances and covariances) corresponding to the tested pixel.

An operation 740 wherein a parameter D, which is indicative of a norm (i.e. a magnitude) of a vector $t = d_\Gamma - (G_{linear}/\|s_\Gamma\|^2) s_\Gamma$, is computed. $d_\Gamma = \Gamma d$, $s_\Gamma = \Gamma s$, and $\Gamma^T \Gamma = K^{-1}$.

An operation 750 wherein a score q(g, D), indicative of a probability of the tested pixel being defective, is computed. q(g, D) is a substantially monotonically increasing function of g, and a substantially monotonically decreasing function of D, at least over a range of values of g and a range of values of D obtainable in wafer inspection.

An optional operation 760 wherein the tested pixel is labelled as defective, or potentially defective, if the score q(g, D) is greater than a threshold S.

According to some embodiments, method 700 may be implemented using a scan data analysis module, such as scan data analysis module 504 of system 500.

As used herein, according to some embodiments, scan data (such as the scan data received in operation 710), which is said to "correspond" to a tested pixel (e.g. central pixel 630c') may also include scan data of pixels neighboring the tested pixel (e.g. neighboring pixels 630c''). In such embodiments, the "corresponding" reference data in operation 720, in addition to including reference data pertaining to the tested pixel, also includes reference data pertaining to the neighboring pixels. In particular, the scan data of the neighboring pixels may be taken into account in determining whether the pixel is defective, as described below. Further, variances and covariances, which are said to "correspond" to the tested pixel (e.g. central pixel 630c') may also include variances and covariances between pixels neighboring the tested pixel (e.g. between pairs of pixels from neighboring pixels 630c''), i.e. when the scan data is of the tested pixel as well as pixels neighboring thereto.

Finally, when the scan data is multi-reference, covariances, which are said to "correspond" to the tested pixel, may relate two difference variables, each of which pertains to the tested pixel, or one of its neighbors, and a different reference pixel, respectively. For example, a first difference variable may pertain to the tested pixel (e.g. central pixel 630c') and a first reference pixel (e.g. central pixel 630b'), and a second difference variable may pertain to the tested pixel (e.g. central pixel 630c') and a second reference pixel (e.g. a pixel analogous to central pixel 630c' in segment 624d). Or, for example, a first difference variable may pertain to the tested pixel (e.g. central pixel 630c') and a first reference pixel (e.g. central pixel 630b'), and a second difference variable may pertain to a pixel neighboring the tested pixel (e.g. one of neighboring pixels 630c'') and a second reference pixel (e.g. a pixel in segment 624d, which is analogous to the pixel neighboring pixel 630c').

According to some embodiments, the scan data received in operation 710 may be of a single pixel (e.g. a gray level value pertaining to central pixel 630c'). In such embodiments, the reference data, used to compute the difference vector d in operation 720, may include scan data of one or more pixels analogous to the pixel and therefore also analogous to each other (e.g. central pixel 630b' and/or a pixel analogous to central pixel 630c' in segment 624d), essentially as described above in the Systems subsection in with respect to scan data analysis module 504 operation. According to some such embodiments, the scan data received in operation 710 may be multi-perspective scan data of a single pixel (e.g. a plurality of gray level values pertaining to central pixel 630c' with each gray level value representing a different perspective).

According to some embodiments, the scan data received in operation 710 may be of a first group of pixels (e.g. gray level values pertaining to group of pixels 630c) including a central pixel and neighboring pixels (i.e. pixels neighboring the central pixel). As non-limiting examples, according some embodiments, each of the neighboring pixels may share a common edge with the central pixel (in which case the number of neighboring pixels is four), or each of the neighboring pixels may share at least one corner with the central pixel (in which case the number of neighboring pixels is eight). In such embodiments, the reference data, used to compute the difference vector d in operation 720, may include scan data corresponding to one or more groups of pixels, such that each pixel in each group is analogous to a respective pixel in the first group (e.g. group of pixels 630b and/or a group of pixels in segment 624d, each of which is analogous to a respective pixel from the first group), essentially as described above in the Systems subsection in with reference to scan data analysis module 504. According to some such embodiments, the scan data may be multi-perspective scan data of a first group of pixels (e.g. a plurality of gray level values pertaining to central pixel 630c' and neighboring pixels 630c'', such that to each pixel pertain two or more gray level values, respectively, with each of the two or more gray level values representing a different perspective).

According to some embodiments, the reference data, used to compute the difference vector d in operation 720, may include design data, such as CAD data.

Figure 8:
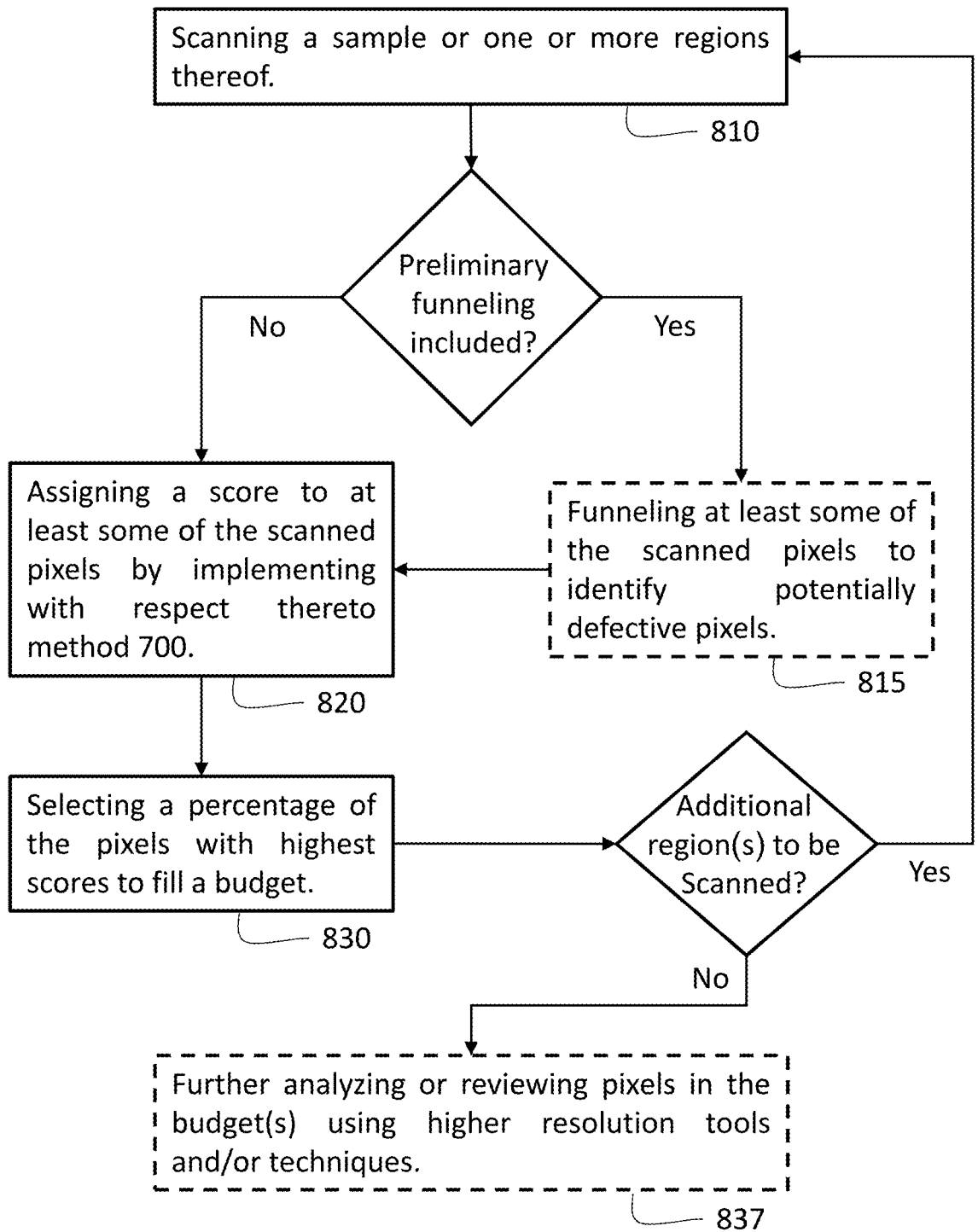
FIG. 8 presents a flowchart of a method for wafer inspection (i.e. scan and analysis), which incorporates the method of FIG. 7, according to some embodiments.

According to some embodiments, e.g. embodiments wherein method 700 is implemented as part of a wafer inspection protocol, such as the wafer inspection protocol of FIG. 8, the received scan data may be an image frame (e.g. image frame 634*c*) of a scanned segment (e.g. segment 624*c*) along a scanning path (e.g. slice 612) effected by the imager (e.g. imager 516). Operations 710-750 (and optionally operation 760) may then be implemented with respect to a plurality (e.g. some or all) of the image pixels in the image frame. In particular, in operation 720 one or more difference images may be obtained from the image frame and one or more reference images, respectively. The one or more difference images specify the components of the difference vectors d, i.e. the sets of difference values corresponding to the imaged (i.e. scanned) pixels, respectively.

In particular, as part of obtaining the one or more difference images, one of, some of, or each of the one or more reference images (e.g. image frame 634*b* and, optionally, one or more image frames pertaining to one or more of segments 624*a*, 624*d*, and 624*c*, respectively) may be registered with respect to the image frame (e.g. image frame 634*c*) prior to obtaining the difference images. Alternatively, according to some embodiments, each reference image may be registered with respect to a last obtained image frame (e.g. image frame 634*b* is registered with respect to the image frame pertaining to segment 624*a*, image frame 634*c* is registered with respect to image frame 634*b*, and so on).

According to some embodiments, the one or more reference images may be of one or more segments on one or more other dies: for example, when method 700 is implemented as part of a D2D or a D2MD wafer inspection protocol (e.g. in embodiments wherein the wafer inspection protocol of FIG. 8 is a D2MD wafer inspection protocol).

According to some embodiments, wherein method 700 is implemented as part of a C2C or a C2MC wafer inspection protocol (e.g. in embodiments wherein the wafer inspection protocol of FIG. 8 is a C2C wafer inspection protocol), the reference pixels may be positioned within the same segment as the tested pixel. For example, when the scan data is of a group of pixels, i.e. a cell, such as groups of pixels 630*c* within segment 624*c*, the references may be of pixels within an analogous cell within the segment, such as group of pixels 632*c*.

As used herein, reference data may be referred to as "multi-reference" when including scan data from two or more dies or cells. In particular, the reference data utilized in a D2MD wafer analysis protocol are multi-reference. Similarly, the reference data utilized in a C2MC wafer analysis protocol are multi-reference.

According to some embodiments, wherein method 700 is implemented as part of a D2MD or a C2MC wafer inspection protocol (so that the reference data is multi-reference), operation 720 may allow discounting scan data associated with some of the references (e.g. analogous pixels or groups of pixels on each of the reference dies or cells). For example, a reference, which has previously been diagnosed as defective or potentially defective, may be discounted. Or, for example, scan data associated with a reference, which significantly differs from the scan data associated with the other references, may be discounted. In particular, in embodiments wherein the scan data received in operation 710 is of a single pixel (e.g. in a single perspective), if a difference value associated with a reference pixel is of opposite sign to the difference values associated with the rest of the reference pixels, that difference value may be discounted. Another option is to discard difference values for which the magnitude of their contribution to the GA-based expression (i.e. $G_{linear}$) is smaller than a bound (e.g. 0.1), which, according to some embodiments, may be predefined. Further, the number of references to be used may be predefined in the sense that a fixed number of references, which are the best according to some criteria, are selected and the rest are discarded. It is noted that discounting one or more references leads to a reduction in the dimension of the difference vector d. The predetermined kernel and the covariance matrix are then accordingly tweaked.

According to some embodiments, the one or more reference images may be obtained from corresponding reference data, such as design data (for example, CAD data), e.g. when method 700 is implemented as part of a die-to-database (D2DB) wafer inspection protocol (e.g. in embodiments wherein the wafer inspection protocol of FIG. 8 is a D2DB wafer inspection protocol). In such embodiments, prior to obtaining the difference image, the reference data may have to be mathematically transformed to generate a graphical representation thereof (i.e. a representation in terms of gray level values). The image frame may then be registered with respect to the graphical representation of the reference data prior to obtaining the difference image.

It is noted that in a multi-perspective wafer inspection protocol, the received scan data may be a plurality of image frames, each in a respective perspective. In which case, as part of obtaining the difference images in the different perspectives, image frames in different perspectives (which are not simultaneously acquired) may have to be registered with respect to one another. According to some embodiments, the registration may be implemented using scan data obtained from a common channel (which does not change when switching between perspectives). According to some such embodiments, the multi-perspective scan data is obtained from a brightfield channel, while a grayfield channel is used for registering the images with respect to one another. Alternatively, the multi-perspective scan data may be obtained from the grayfield channel, while the brightfield channel is used for registering the images with respect to one another. (The "perspective-to-perspective" registration may be implemented in addition to standard die-to-die registration and/or cell-to-cell registration.)

As used herein, the term "difference image" is to be understood in an expansive manner and may refer to any image obtained by combining at least two images, for example, a first image (e.g. an image of an area on a wafer or an image obtained from a plurality of images of the area) and a second image (e.g. a reference image of a corresponding area on the wafer, or a reference image derived from reference data of the corresponding area). The combination of the two images may involve any manipulation of the two images resulting in at least one "difference image", which may reveal variation (differences) between the two images, or, more generally, may distinguish (differentiate) between the two images (when differences are present). In particular, it is to be understood that the term "combination", with reference to two images, may be used in a broader sense than subtraction of one image from the other and covers other mathematical operations, which may be implemented additionally, or alternatively, to subtraction. Further, it is to be understood that prior to combining the two images to obtain the difference image, one or both of the two images may be individually manipulated (that is, pre-processed). For example, the first image may be registered with respect to the second image.

As used herein, the term "reference data" should be expansively construed to cover any data indicative of a physical design of a patterned wafer and/or data derived from the physical design (e.g. through simulation). In particular, according to some embodiments, wherein method 700 is implemented as part of a wafer inspection protocol, reference data may include, or consist of, reference images obtained in runtime (i.e. during the scan). For example, scan data—obtained in runtime—of a segment on a die (e.g. segment 624b), or corresponding segments (i.e. segments having the same architecture) on multiple dies, may serve as reference data for a corresponding segment (e.g. segment 624c) on another die.

Further, reference data or additional reference data utilized in analyzing scan data of a first wafer may be generated based on scan data of one or more previously scanned wafers, particularly wafers fabricated to the same design as the first wafer.

According to some embodiments, reference data may include, or consist of, "design data" of the wafer, such as, for example, the various formats of CAD data.

According to some embodiments, wherein the scan data is of a single pixel (and the scan data corresponds to a single perspective) and the reference data is multi-reference (from two or more dies), the predetermined kernel s may be substantially proportional to a vector whose components are all equal. The dimensionality of s (i.e. the number of components thereof) may be equal to the number of reference pixels (i.e. the number of analogous pixels used as references). Thus, for example, when the number of reference pixels is four, s may be proportional to the vector (1, 1, 1, 1). (The equality of the components reflects an assumed identity of the reference pixels, which, in the absence of noise, are therefore expected to give rise to identical signals.)

According to some embodiments, wherein the scan data is of a group of pixels, the components of s may not have the same magnitude. This is because different pixels in a reference group of pixels (i.e. a group of pixels used as reference in operation 720) may give rise to different signals, respectively, due to structural (e.g. geometrical and/or compositional) variances between the pixels. Thus, for example, when the scan data is of a group of two pixels and there is one reference group of pixels, s may be substantially proportional to the vector (1, R). R is the ratio of the expected difference value pertaining to the second pixel in the reference group to the expected difference value pertaining to the first pixel in the reference group. In particular, according to some embodiments, R may be negative. As yet another example, when the scan data is of a group of two pixels and there are two reference groups of pixels, s may be substantially proportional to the vector (1, R, 1, R). The first component pertains to the first pixel in the first reference group of pixels, the second component pertains to the second pixel in the first reference group of pixels, the third pertains corresponds to the first pixel in the second reference group of pixels, and the fourth component pertains to the second pixel in the second reference group of pixels. Generally, R can be negative or even zero.

As used herein, a covariance matrix (such as the covariance matrix K in operation 730) may be said to "correspond" to a tested pixel (e.g. central pixel 630c') also when including variances and covariances pertaining to pixels neighboring the tested pixel (e.g. neighboring pixels 630c"), and, in particular, inter-pixel covariances—that is, covariances pertaining to pairs of pixels neighboring the tested pixels. Non-limiting examples include central pixel 630c' and one of neighboring pixels 630c", pairs of pixels from neighboring pixels 630c".

More specifically, in the present context, each term in the covariance matrix relates a respective pair of random variables (also termed herein as "difference variables"). The possible outcomes of a difference variable may constitute a range of difference values (according to the range of gray level values assumable by a tested pixel and—when the reference data is not design data—the range of gray level values assumable by a reference pixel). A given difference value constitutes a specific realization of the difference variable (which in turn—when the reference data is not design data—constitutes the difference between the realizations of two random variables, pertaining to the intensities of the tested pixel and the reference pixel, respectively). Each variance term in the covariance matrix represents the expected value of the square deviation of a difference variable. Similarly, each covariance term in the covariance matrix represents the expected value of the product of two deviations: of a first difference variable and a second difference variable. More precisely, the expected value is taken over the product of (i) the first difference variable minus its expected value and (ii) the second difference variable minus its expected value.

To relate the discussion in this subsection to the description of FIGS. 3A-4B, it is noted that the vector t in operation 740—when expressed in terms of a cylindrical coordinate system defined by $s_\Gamma$—equals $d_\Gamma^{(\perp)} \hat{r}$, wherein $d_\Gamma^{(\perp)}$ is the radial component of $d_\Gamma$ in the cylindrical coordinate system (i.e. $d_\Gamma = d_\Gamma^{(\|)} \hat{z} + d_\Gamma^{(\perp)} \hat{r}$, wherein $\hat{z} = s_\Gamma / \|s_\Gamma\|$).

Referring to operations 740 and 750, according to some embodiments, g is substantially equal to $G_{linear}$. According to some embodiments, D is substantially proportional to $\|t\|$.

Referring to operation 750, the minimum range of values of g—over which q(g, D) is a substantially monotonically increasing function of g—may be equal to the range of values of g obtainable in wafer inspection. This range is determined by the range of values of the vector $G_{linear}$ obtainable in wafer inspection, which in turn depends on the range of values of the difference vector d obtainable in wafer inspection. Similarly, the minimum range of values of D—over which q(g, D) is a substantially monotonically decreasing function of D—is equal to the range of values of D obtainable in wafer inspection. This range is determined by the range of values of the vector t obtainable in wafer inspection, which in turn depends on the range of values of the difference vector d obtainable in wafer inspection.

According to some embodiments, $q(g, D) = q_0(g) - A(g) \cdot q_1(D)$, wherein each of $q_0$ and $q_1$ is a substantially monotonically increasing function of its argument (in this regard, it is noted that D only assumes non-negative values), at least over respective ranges of values of g and D obtainable in wafer inspection. A is a substantially monotonically increasing function of its argument, at least over a range of values of g obtainable in wafer inspection. $q_1$ is a non-negative function and A is a positive function. According to some embodiments, $q_0(g)$ is substantially equal to g. According to some such embodiments, $q_0(g)$ is substantially equal to $G_{linear}$. In such embodiments, the greater $q_1(D)$ the greater the deviation from the gaussian approximation. According to some embodiments, $q_1(D)$ is substantially proportional to D.

According to some embodiments, g is substantially equal to $G_{linear}$, and D is substantially equal to $a\|t\|$, wherein a is a positive constant, so that q(g, D) is substantially equal to $G_{linear} - a\|t\|$. In such embodiments, for a given value of the score (that is, q(g, D)=S), q(g, D) forms a cone centered about $s_\Gamma$ with the apex of the cone positioned on the (flat) plane defined by $G_{linear}$. Hence, $a=\tan(\alpha)\cdot\|s_\Gamma\|$, wherein $180°-2\cdot\alpha$ is the aperture angle if the cone. For any given whitened difference vector $d_\Gamma$, the test corresponding to the score S therefore reads: if $s_\Gamma \cdot d_\Gamma - \tan(\alpha)\cdot\|s_\Gamma\|\|d_\Gamma^{(\perp)}\| \geq S$, the tested pixel associated with $d_\Gamma$ is defective or potentially defective. Otherwise, the tested pixel is determined to be non-defective.

A specific embodiment of the above-described test is depicted in FIG. 3A, with $a=\tan(\alpha)\cdot\|s_\Gamma\|=\tan(\alpha)$ (since in the description of FIG. 3A the norm of $s_\Gamma$ was set equal to one, i.e. $\|s_\Gamma\|=1$), $t=u-[(s_\Gamma \cdot u)/s_\Gamma^2]s_\Gamma=u-(s_\Gamma \cdot u)s_\Gamma$, $S=T$, and the plane defined by $G_{linear}$ given by the equation $G_{linear}=s_\Gamma \cdot u=T$.

More generally, according to some embodiments, the aperture angle of the cone (e.g. $\mu=2\cdot\beta$ in FIGS. 3A-3C) may substantially continuously decrease as $G_{linear}$ is increased, in which case $q(g, D)$ is substantially equal to $G_{linear}-A$ $(G_{linear})\cdot\|t\|$, wherein A is positive, and substantially monotonically increases as its argument is increased (at least over a range of values of its argument, i.e. $G_{linear}$, obtainable in wafer inspection).

According to some such embodiments, the scan data, received in operation 710, may include multi-perspective scan data corresponding to the (first) pixel. Different perspectives may differ from one another in preparation and/or collection. For example, different perspectives may differ from one another in an incidence angle at which the scanning (light) beam is projected on the wafer and/or a collection angle at which light scattered off the wafer is sensed.

According to some embodiments, the covariance matrix K may include covariances relating pairs of difference variables pertaining to different perspectives (i.e. inter-perspective covariances). According to some embodiments, wherein the scan data corresponding to the tested pixel is of a group of pixels (including the tested pixel), the covariance matrix K may include covariances relating pairs of difference variables pertaining to different perspectives: a first difference variable in a first perspective, which pertains to one pixel in the group, and a second difference variable in a second perspective, which may pertain to another pixel in the group or to the same pixel.

More specifically, each perspective (also referred to as "attribute") may be defined by a compatible combination of a preparation perspective, selected from a group of one or more preparation perspectives, and a collection perspective selected from a group of one or more collection perspectives. According to some embodiments, the one or more preparation perspectives may be selected from an intensity of an illumination beam, a polarization of the illumination beam, an illumination wavefront, an illumination spectrum, a focus offset of the illumination beam, one or more maskings of the illumination beam, relative phase(s) between distinct sub-beams of the illumination beam, and compatible combinations thereof. According to some embodiments, the at least one collection perspective may be selected from an intensity of returned light, a polarization of returned light, a spectrum of returned light, a collection angle(s), a brightfield channel, a grayfield channel, one or maskings of the returned light, Fourier filtering of returned light, and a sensing type selected from intensity, phase, or polarization, and compatible combinations thereof.

According to some embodiments, operation 760 may serve as a funnel, wherein if the tested pixel is labeled as potentially defective, the tested pixel may undergo additional testing using computationally more advanced techniques (e.g. based on artificial neural networks) and/or higher-resolution tools (e.g. scanning electron microscopy) to determine whether the tested pixel is in fact defective.

According to some embodiments, different types of defects may be manifested by the scan data corresponding to the tested pixel (e.g. central pixel 630c'). Each type of defect may be characterized by a different predetermined kernel. For example, the scan data corresponding to the tested pixel may manifest each of n different types of defects. Each of the n types of defects may be characterized by a respective predetermined kernel from a set of n predetermined kernels $\{s^{(i)}\}_{i=1}^{n}$ (wherein $s^{(j \neq i)} \neq s^{(i)}$).

Thus, according to some embodiments, operations 730-750 may be implemented n times, each time with respect to a different predetermined kernel from the set $\{s^{(i)}\}_{i=1}^{n}$. According to some embodiments, the form of the score function $q(g, D)$—i.e. the functional dependence of q on g and/or D—may change from one implementation to the next. Put another way, in each implementation a different score function from a set of n score functions $\{Q^{(i)}(g, D)\}_{n=1}^{n}$ may be utilized (such that in the i-th implementation, the score function $Q^{(i)}(g, D)$ and the i-th predetermined kernel $s^{(i)}$ are employed).

As a non-limiting example, given two predetermined kernels of the same magnitude, characterizing a first type of defect and a second type of defect, respectively, an aperture angle of a first decision hyper-cone, associated with detecting the first type of defect at a given false alarm rate, may be greater than an aperture angle of a second decision hyper-cone, associated with detecting the second type of defect at the given false alarm rate.

As another non-limiting example, given two predetermined kernels of the same magnitude, characterizing a first type of defect and a second type of defect, respectively, a curvature of a first decision hypersurface, associated with detecting the first type of defect at a given false alarm rate, may be greater than a curvature of a second decision hypersurface, associated with detecting the second type of defect at the given false alarm rate.

More generally, a first family of decision hypersurfaces, associated with detecting a first type of defect, and a second family of decision hypersurfaces, associated with detecting a second type of defect, may markedly differ in shape, such that, for example, the first family may be constituted by hyper-cones and the second family may be constituted by curved hypersurfaces. Or, for example, the first family may be constituted by hyperplanes (so that the GA-based test is utilized to detect the first type of defect), while the second family may be constituted by non-flat (e.g. curved) hypersurfaces. Such a scenario may be of relevance when the first type of defect is significantly easier to detect than the second type of defect.

Additionally, or alternatively, according to some embodiments, the functional dependence of g on $G_{linear}$, and/or the functional dependence of D on $\|t\|$, may depend on the type of defect checked for (such that in the i-th implementation respective functions $g^{(i)}(G_{linear})$ and $D^{(i)}(\|t\|)$ are employed).

Additionally, or alternatively, according to some embodiments, wherein the reference data is multi-reference, not all of the references are necessarily taken into account in checking for a given type of defect. In particular, a greater number of references may be taken into account when checking for types of defects which are harder to detect. Additionally, or alternatively, according to some embodiments, wherein the scan data corresponding to the test pixel includes scan data of additional pixels neighboring the tested pixel, not all of the additional pixels are necessarily taken into account in checking for a given type of defect. In particular, a greater number of neighboring pixels may be taken into account when checking for types of defects which are harder to detect.

Additionally, or alternatively, according to some embodiments, wherein the scan data is multi-perspective, not all perspectives are necessarily taken into account in checking for a given type of defect. In particular, a greater number of perspectives may be taken into account when checking for types of defects which are harder to detect. Moreover, different perspectives may be employed in detecting different types of defects.

According to some embodiments, when implementing operations 730-750 with respect to different predetermined kernels, the different score functions utilized (i.e. $\{Q^{(i)}(g, D)\}_{i=1}^{n}$) may be so normalized (e.g. scaled and/or increased or decreased by a factor dependent on the value of the index i), such as to allow comparing scores computed for different types of defects (from the scan data corresponding to a pixel), and selecting a single score per pixel. In particular, the scores may be "regraded", such that a score $Q^{(i)}(g, D)$ is assigned a respective weight factor and/or additive constant, which depends on i (i.e. the type of defect). More generally, the totality of obtained scores may be jointly (i.e. collectively) "regraded", such as to obtain a single score. Put another way, the set $\{Q^{(i)}((g, D)\}_{i=1}^{n}$ may be used as an input, based on which, a (single) output score is generated. The output score may thus differ from any one of the input scores—and in particular, the highest score—instead, corresponding to a function (e.g. a linear combination) of the input scores. This operation is referred to herein as "regrading".

According to some embodiments, artificial intelligence (AI) tools, such as machine learning tools, may be used to determine the set of score functions and the dependencies of g on $G_{linear}$ and D on $\|t\|$ for each type of defect. In particular, an artificial neural network (ANN), e.g. a deep neural network (DNN), may be used to determine the set of score functions and the dependencies of g on $G_{linear}$ and D on $\|t\|$ for each type of defect, dependent on a set of parameter values characterizing the defect (e.g. dependent on the predetermined kernel pertaining thereto). Each set of (input) parameters values constitutes a set of inputs for the ANN. Each set of outputs includes a set of (output) parameters values specifying the functional form of Q(g, D) and/or the functional dependencies of g on $G_{linear}$ and D on $\|t\|$.

It is noted that an ANN is adaptable in the sense that it may be updated (i.e. the weights of the ANN may be adjusted, thereby modifying the output set), as data from actual applications of method 700 is accumulated. More specifically, when method 700 is implemented as part of a wafer analysis protocol, which also includes a review of potentially defective pixels (detected by method 700) using higher resolution tools and/or techniques—such as the wafer inspection protocol of FIG. 8, according to some embodiments thereof—the review provides "feedback", based on which the weights of the ANN may be modified.

Similarly, according to some embodiments, wherein the reference data is multi-reference, AI tools may be used to estimate a "quality" of each reference and select a subset of references to be employed in computing the score associated of a tested pixel. More generally, the number of references and/or pixels utilized with respect to each type of defect may be determined employing, or additionally employing, AI tools.

Further, according to some embodiments, wherein the scan data is multi-perspective, the choice of perspectives (and number) utilized with respect to each type of defect may be determined employing, or additionally employing, AI tools.

Finally, according to some embodiments, AI tools may be used to estimate, or improve on estimates of, the covariance matrix and optionally the predetermined kernel.

FIG. 8 presents a flowchart of a computerized method 800 for sample analysis (e.g. wafer inspection), according to some embodiments. Method 800 may include operations of:

An operation 810 wherein a wafer, or one or more regions thereof, are scanned, thereby obtaining scan data of a plurality of pixels on the wafer.

An optional operation 815 wherein the plurality of pixels undergoes a preliminary inspection to identify potentially defective pixels.

An operation 820 wherein each of the plurality of pixels—or, if operation 815 is included, each of the potentially defective pixels—is assigned a respective score by implementing with respect thereto method 700, according to some embodiments thereof.

An operation 830 wherein a percentage of the pixels (assigned scores in operation 820), which have the highest scores, are selected to fill a budget (i.e. quota).

An optional operation 833 (not numbered in FIG. 8), contingent on only a region of the sample (and not the full sample) having been scanned in operation 810, wherein operations 810 to 830 are repeated with respect to each of one or more other regions, e.g. until the sample is fully scanned.

An optional operation 837 wherein the pixels in the budget(s) are reviewed or further analyzed using higher resolution tools and/or techniques.

According to some embodiments, method 800 may be implemented using computerized system 500 or a computerized system similar thereto.

According to some embodiments, in operation 810 the wafer (or a region thereof) are scanned slice-by-slice in alternating directions, as known in the art wafer inspection and as depicted, for example, in FIG. 6A.

According to some embodiments, operations 810 and 820 may be implemented simultaneously or substantially simultaneously, so that scanned pixels are assigned a score in real-time or near real-time.

According to some embodiments, in operation 820 method 700 is applied to detect different types of defects. That is, per scan data associated with at least some of the pixels, method 700 is performed a plurality of times, each time with respect to a different predetermined kernel (as described above in the description of method 700). According to some such embodiments, each pixel is assigned a single score, e.g. the highest score from the scores computed for the different predetermined kernels (optionally after regrading). According to some alternative embodiments, each type of defect is assigned a different budget.

According to some embodiments, method 800 is, or includes, a D2D or a C2C wafer inspection protocol. According to some such embodiments, operations 810 and 820 may be implemented simultaneously, or substantially simultaneously, essentially as described in the System subsection in with reference to D2D and C2C implementations. According to some embodiments, method 800 is, or includes, a D2MD or a C2MC wafer inspection protocol. According to some such embodiments, operations 810 and 820 may be implemented simultaneously, or substantially simultaneously, essentially as described in the System subsection in with reference to D2MD and C2MC implementations. According to some embodiments, method 800 is, or includes, a D2DB wafer inspection protocol. According to some embodiments, method 800 may involve D2D, D2MD, C2C, C2MC, and/or D2DB comparisons as part of the implementation of method 700 in operation 820.

According to some embodiments, wherein the scan data are multi-perspective, and/or wherein the received scan data (received in (sub)-operation 710 of operation 820) are of a group of pixels, in order to speed up the computations of the scores, some or all of the inter-pixel covariances and/or inter-perspective covariances in the covariance matrix are neglected (i.e. the respective entries in the covariance matrix are set to zero). According to some embodiments, wherein the scan data are of a group of pixels and the scan data are multi-perspective, only covariances which are both inter-pixel and inter-perspective may be neglected.

According to some embodiments, the covariance matrices corresponding to the pixels, used in operation 820 (i.e. in operations 730-750 of method 700) to assign the scores to the pixels, may be computed (i.e. prior to performing method 800) based on previously acquired (i.e. obtained) scan data, e.g. collected in the scanning of one or more wafers of the same design as the currently scanned wafer (i.e. the wafer with respect to which method 800 is being implemented). According to some embodiments, in embodiments wherein the scan data corresponding to the pixel includes scan data of a plurality of pixels, the earlier acquired scan data may be used to compute the predetermined kernels (e.g. to compute the ratio R when the scan data corresponding to the pixel includes two pixels).

Alternatively, or additionally, according to some embodiments, method 800 may include a preliminary scanning operation (not shown in FIG. 8), wherein the wafer is partially scanned. More specifically, the wafer may be "sampled" in the sense that a sample of areas on the wafer is scanned. The sampled areas may be selected to be representative of areas on the wafer, which are characterized by a certain architecture, type(s) of components, and so on. From the scan data obtained in the preliminary scan, covariance matrices and/or predetermined kernels corresponding to pixels in the representative areas may be generated, which may then be used with respect to all areas corresponding to the representative areas.

According to some such embodiments, the scan data may further be utilized to "tailor" a score function to each sampled area (so that in different implementations of method 700 in operation 820, a different score function may be employed depending on the position of the pixel whose score is being computed). That is, based on the scan data, a set of score functions $\{Q_n(g, D)\}_n$ may be determined, wherein the index n runs over the sampled areas. The score functions may differ from one another in the dependence of $Q_n$ on g and/or D. Additionally, or alternatively, the score functions may differ from one another in the dependence of g on $G_{linear}$ and/or the dependence of D on $\|t\|$ (in which case, sets $\{g_i\}_i$ and/or $\{D_n\}_n$ are additionally determined or determined instead). More generally, based on the scan data, a set of score functions $\{Q_{nm}(g, D)\}_{n,m}$, may be determined, wherein the index n runs over the sampled areas and the index m runs over subareas within the sampled areas. According to some embodiments, artificial intelligence (AI) tools, such as machine learning tools, may be used to determine the set of score functions and the dependencies of g on $G_{linear}$ and D on $\|t\|$ for each type of area or subarea.

According to some embodiments, the covariance matrix corresponding to the pixel may be computed in runtime, based at least on scan data obtained during the scan. According to some embodiments, the scan data may include scan data of a die area including the pixel, and optionally (e.g. in D2MD applications), scan data of one or more die areas, including analogous pixels, in neighboring dies. According to some embodiments, the scan data may be multi-perspective. As non-limiting example, the die-area may include between about $10^5$ to about $10^6$ pixels. According to some embodiments, the scan data may be multi-perspective.

According to some embodiments, per at least some die areas, the form(s) of score function(s) corresponding thereto (whether at the level of the dependence of the score function on g and D and/or the dependence of g on $G_{linear}$ and/or D on $\|t\|$) may be computed in runtime based at least on scan data obtained during the scan. Alternatively, according to some embodiments, the forms of the score functions may be pre-defined.

According to some embodiments, in operation 815 (when included), each of the pixels may be assigned a preliminary score based on the gaussian approximation. (So that a pixel associated with a difference vector d is assigned the preliminary score $G_{linear}=s\cdot K^{-1}d$). According to some embodiments, a preliminary budget is assigned in operation 815, whereby the preliminary budget is filled by the pixels having the highest preliminary scores. Operation 820 is then implemented only with respect to the pixels in the preliminary budget. Alternatively, according to some embodiments, only pixels whose score is greater than a predetermined threshold are "funneled", so that operation 820 is then implemented only with respect thereto.

More generally, the preliminary score may be computed based on a mathematical expression (for example, $G_{linear}$ but not limited thereto), which is a relaxation of the mathematical expression used to compute the scores in operation 820. That is, the mathematical expression of operation 815 may be less computationally costly or otherwise easier and/or faster to compute than the mathematical expression used to compute the scores in operation 820. According to some embodiments, the test constituted by the mathematical expression of operation 815 may be less stringent than that of operation 820 in the sense that any one, or substantially any one, of the initial pixels (i.e. the plurality of pixels of operation 810), whose score according to the test of operation 820 exceeds the corresponding threshold (whether predetermined or dynamical), will necessarily "pass" the test of operation 815.

According to some embodiments, wherein the obtained scan data is multi-perspective, in operation 815 each of the pixels may be assigned a preliminary score, which is equal to a function $g_{relax}^{(a)}(g, D)$. $q_{relax}^{(a)}(g, D)$ may be similar to q(g, D) but differs therefrom in that some or all of the inter-perspective covariances are neglected, thereby easing the computational load relative to q(g, D). According to some embodiments, wherein the scan data in (sub)-operation 710 of operation 820 is of a group of pixels, in operation 815 each of the pixels may be assigned a preliminary score, which is equal to a function $g_{relax}^{(b)}(g, D)$. $q_{relax}^{(b)}(g, D)$ may be similar to q(g, D) but differs therefrom in that some or all of the inter-pixel covariances are neglected, thereby easing the computational load relative to q(g, D).

According to some embodiments, in operation 837 the pixels in the budget may be reviewed using a scanning electron microscope (SEM) and/or an atomic force microscope (AFM).

Results of Simulations

FIGS. 9A and 9B present simulation-obtained scatter plots of events in two-dimensional probability spaces, respectively. Each event corresponds to a pair of uncorrelated difference values (randomly selected from a predefined noise distribution corresponding to the respective probability space) associated with a pixel on a wafer. Each of the probability spaces is characterized by a different noise distribution. Each of the events corresponds either to noise or to the pixel being defective. Events due to noise are each indicated by a black square symbol, while events corresponding to a pixel being defective are each indicated by a cross symbol. Each of the two axes quantifies a respective difference value. The difference values are specified in terms of arbitrary units. In each of FIGS. 9A and 9B only the first quadrant of the respective probability space is shown with the noise distributions (i.e. discounting effects due to defects) implicitly understood to be symmetrically distributed among the four quadrants.

The noise distribution characterizing the probability space of FIG. 9A is purely gaussian (i.e. the density of events is a gaussian function). The noise distribution characterizing the probability space of FIG. 9B is an equal mixture of gaussian noise and exponential noise (i.e. $N \cdot \exp[-\lambda(|u_1|+|u_2|)]$, wherein $u_1 \in (-\infty, \infty)$ and $u_2 \in (-\infty, \infty)$, $1/\lambda$ is the standard deviation, and N is the normalization factor of the exponential distribution). Thus, as compared to FIG. 9A, in FIG. 9B more outlying events are present. That is, events characterized by greater disparity between the values of $u_1$ and $u_2$ are present—as exemplified, for instance, by the events indicated by points 905a and 905b.

Referring to FIG. 9A, a whitened predetermined kernel is indicated by an arrow 910. Also indicated is a threshold decision line 920. Decision line 920 is straight. As explained above, in the pure (two-dimensional) gaussian case, optimal decision lines are straight. Decision line 920, put in by hand, approximates an optimal decision line associated with a certain false alarm rate (not specified herein). Referring to FIG. 9B, a whitened predetermined kernel is indicated by an arrow 960. Also indicated are a (dotted) straight decision line 970, a (dashed) V-shaped (i.e. wedge shaped) decision line 970', and a curved decision line 970". Similarly to decision line 920, decision lines 970, 970', and 970" were also put in by hand. Each of decision lines 970' and 970" displays mirror symmetry about arrow 960. In particular, decision lines, such as decision lines 970', and 970", may be obtained utilizing method 700.

Typically, in wafer inspection, it is desirable to reduce the number of false positives, even at the expense of missed detections. The balance, however, is delicate: For instance, removing all false positives at the expense of about 50%, about 40%, or even only about 30% missed detections would typically be considered too excessive.

Perusing FIG. 9A, it does not seem that a V-shaped decision line (e.g. similar to V-shaped decision line 970' but possibly having a different aperture angle), or a curved decision line (e.g. similar to curved decision line 970" but possibly having a different degree of curvature), would provide better distinction between points associated with noise and points associated with defects, as is expected in the case of pure gaussian noise. Rather, it seems that a choice of a V-shaped decision line or a curved decision line would fail to detect many defects (in particular, defects associated with points positioned slightly above line 920, which are comparatively more "outlying") and would misclassify points associated with noise as defects.

Perusing FIG. 9B, it is readily apparent that each of decision lines 970' and 970" improves upon the classification provided by the GA-based test (i.e. straight decision line 970). In particular, outlying events, as represented by points 905a and 905b—which are comparatively much more common under the noise typically present in wafer inspection (i.e. characterized by an exponentially decaying tail)—are classified as noise by decision lines 970' and 970", but would be misclassified under the GA-based test as defects. More specifically, as compared to the GA-based test, utilizing V-shaped decision line 970' reduces the number false positives by 5 (from 7 to 2) at the expense of approximately 17 missed detections. Utilizing curved decision line 970" reduces the number of false positives by 6 at the expense of approximately 18 missed detections. In this regard, it is noted that in FIGS. 9A and 9B, to facilitate the description, the ratio of points associated with defects to points associated with noise is comparable, whereas in actual practice defects are rare events as compared to noise (for instance, about one defect for $10^7$ pixels). Thus, it is usually desirable to suppress essentially all of the noise at the expense of several missed defect detections (e.g. about 1%, about 5%, or even about 10%).

Figures 10A, 10B, 10C:
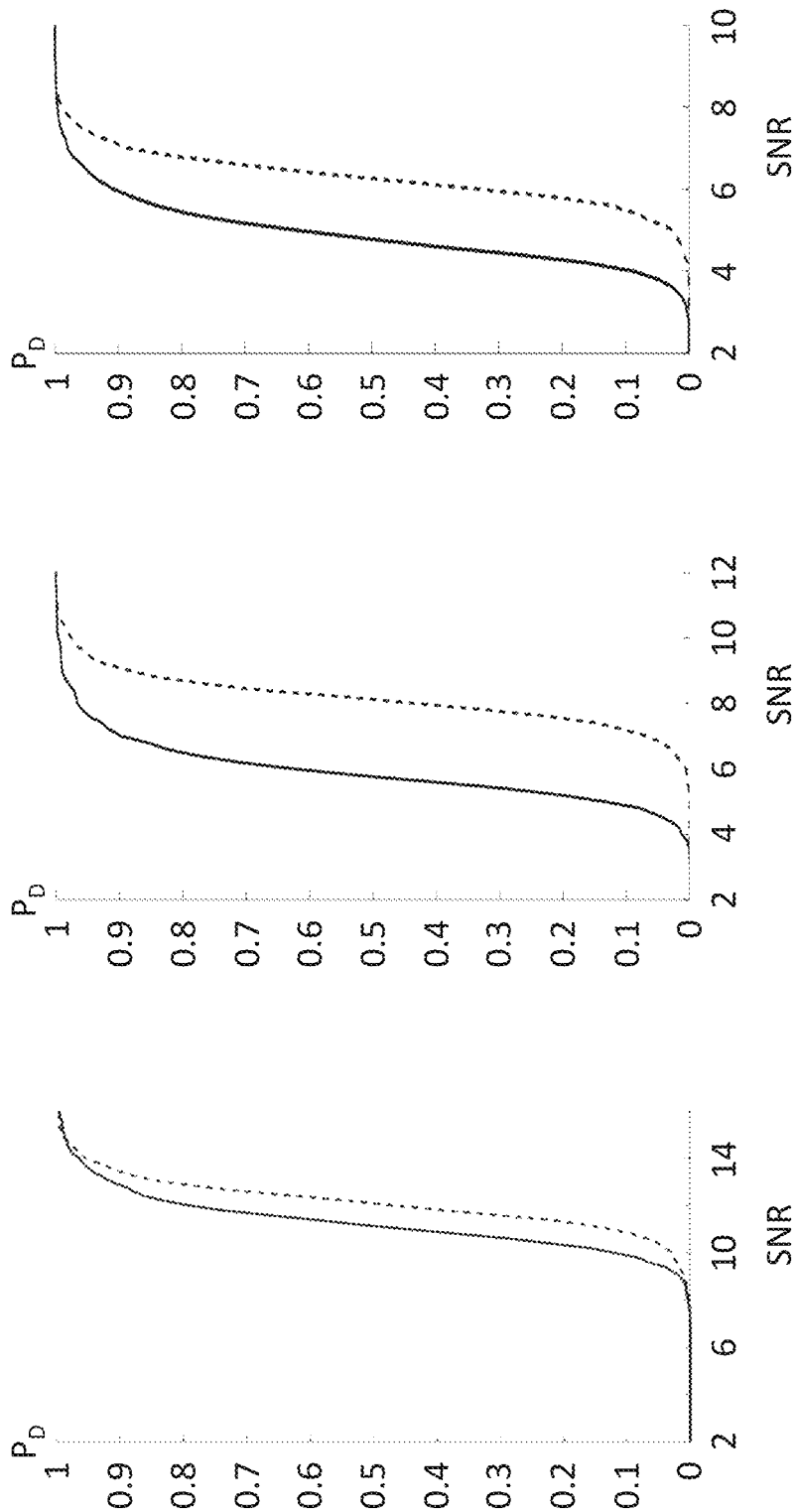

FIGS. 10A-10C are simulation results depicting a probability $P_D$ of detecting a pixel as defective as a function of the signal-to-noise ratio (SNR) present in the setup, according to some embodiments. The noise distribution was taken to be an equal mixture of gaussian noise and exponential noise. More specifically, each of FIGS. 10A-10C depicts the detection probability $P_D$ as a function of the SNR in the case of two, four, and six references, respectively, associated with a pixel on a wafer. Dashed curves depict $P_D$ according to the GA-based test. Solid curves depict $P_D$ according to method 700. In this regard, it is noted that the form of q(g, D) has not undergone optimization. In each of FIGS. 10A-10C, the respective decision hypersurface corresponds to a respective hyper-cone (i.e. in two, four, and six dimensions). Further, the aperture angles of the hyper-cones were not optimized over, and were set equal to 30° in each. Nevertheless, the improved detection capabilities provided by method 700, as compared to the GA-based test, are noticeable.

Figure 11A:
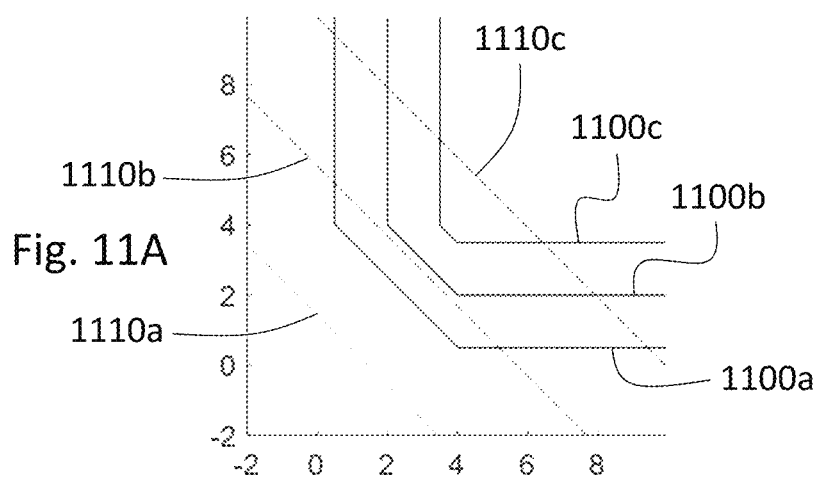
Figure 11B:
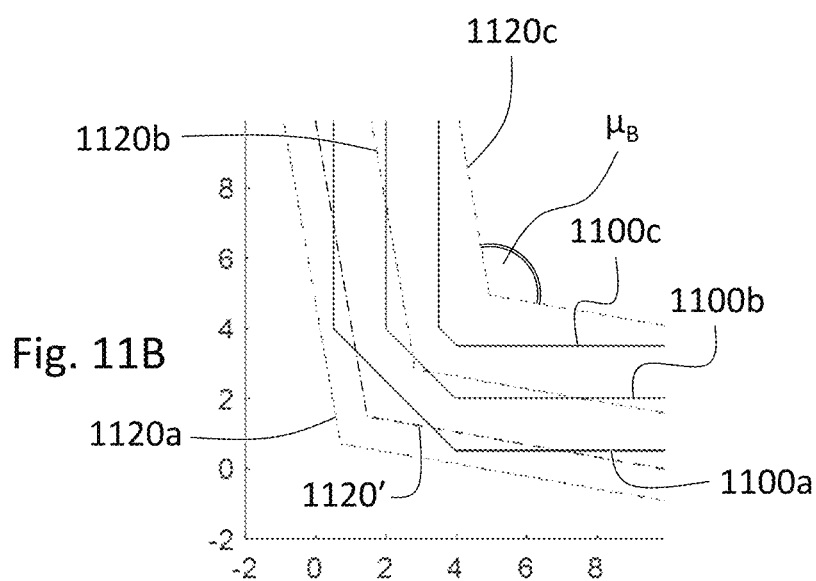
Figure 11C:
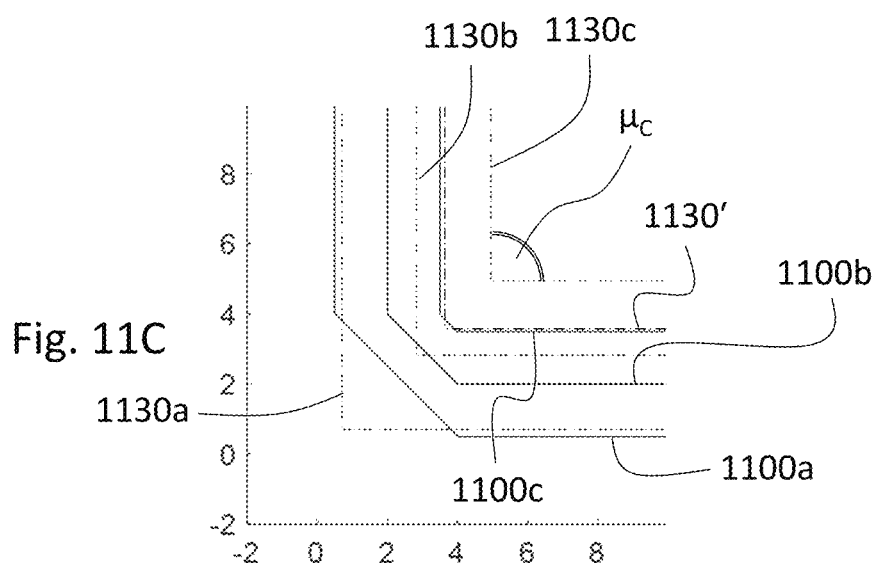

FIGS. 11A-11C illustrate the capacity of the decision lines to approach optimal decision lines even when restricting the score function q(g, D) to a simple form whereby the equal-score hyper-surfaces are hyper-cones, and, in particular, in the case of FIGS. 11A-11C, two-dimensional cones (i.e. V-shaped lines). More specifically, in each of FIGS. 11A-11C three (solid) decision lines 1100a, 1100b, and 1100c are depicted. Decision lines 1100 represent the true (or actual) decision lines associated with an exponential probability distribution $N \cdot \exp[-\lambda \cdot (|u_1|+|u_2|)]$, wherein $u_1 \in (-\infty, \infty)$ and $u_2 \in (-\infty, \infty)$, $1/\lambda$ is the standard deviation, and N is the normalization factor of the exponential distribution. Each of decision lines 1100 is associated with a respective false alarm rate, with decision line 1100a and 1100c lines being associated the highest and lowest false alarm rates, respectively.

Referring to FIG. 11A, decision lines 1110a, 1110b, and 1110c are based on the GA-based test (and hence, are straight). Each of decision lines 1110 is associated with a respective false alarm rate, with decision lines 1110a and 1110c being associated the highest and lowest false alarm rates, respectively.

Referring to FIG. 11B, decision lines 1120a, 1120b, and 1120c are based on method 700, according to some embodiments thereof. Each of decision lines 1120 is V-shaped with an aperture angle $\mu_B$ of 110° (i.e. $\mu_B=110°$). Each of decision lines 1120 is associated with a respective false alarm rate, with decision lines 1120a and 1120c being associated the highest and lowest false alarm rates, respectively.

Referring to FIG. 11C, decision lines 1130a, 1130b, and 1130c are based on method 700, according to some embodiments thereof. Each of decision lines 1130 is V-shaped with an aperture angle $\mu_C$ of 90°. Each of decision lines 1130 is associated with a respective false alarm rate, with decision lines 1130a and 1130c being associated the highest and lowest false alarm rates, respectively.

As can be seen, each of the families of decision lines 1120 of FIG. 11B and 1130 of FIG. 11C match better the true decision lines 1100, at least for a respective range of false alarm rates. For example, a decision line 1120' positioned between decisions lines 1120a and 1120b better matches decision line 1100a than any of decision lines 1110, and, in particular, any straight lines. Similarly, a decision line 1130' positioned between decisions lines 1130b and 1130c better matches decision line 1100c than any of decision lines 1110, and, in particular, any straight lines.

While the disclosure has focused on modifying the GA-based test to take into account the parameter $t=\|t\|=d_\Gamma^{(\perp)}$ (that is, the magnitude of the radial component $d_\Gamma^{(\perp)}=d_\Gamma^{(\perp)}\hat{r}$ of the whitened difference vector $d_\Gamma=d_\Gamma^{(\|)}\hat{z}+d_\Gamma^{(\perp)}\hat{r}$ in the hypercylindrical coordinate system defined by the whitened predetermined kernel), it is to be understood that the scope of the disclosure also covers the case wherein the parameter D, and therefore the score function q(g, D), are additionally dependent on other components of $d_\Gamma^{(\perp)}$ (i.e. components other than $d_\Gamma^{(\perp)}$).

As a non-limiting example, intended to render the discussion more concrete, when the scan data is of a single pixel (and a single perspective) and the reference data includes scan data of three reference pixels, the parameter D may additionally depend on the angle θ, which specifies the direction in which $d_\Gamma^{(\perp)}$ points (i.e. the direction of $\hat{r}$). The consequent dependence of the score function on the angle θ may be such that in some directions the "penalty" increases more slowly with the magnitude of $d_\Gamma^{(\perp)}$ as compared to in other directions. According to some such embodiments, the score function may be of the form q(g, D)=q(g, D(t, θ))=$q_0$(g)−A(g)·$q_1$(D(t, θ)). Each of $q_0$ and $q_1$ is a substantially monotonically increasing function of its argument, at least over respective ranges of values of g and D, which are obtainable in wafer inspection. A is a substantially monotonically increasing function of its argument, at least over a range of values of g obtainable in wafer inspection. $q_1$ and D are non-negative functions. A is a positive function. According to some embodiments, D(t, θ)=$f_A$(θ)·$f_B$(t), wherein $f_A$ and $f_B$ are non-negative functions. Further, $f_B$ is a substantially monotonically increasing function of t (at least over a range of values of t obtainable in wafer inspection). For instance, $f_B$(t) may equal t, so that $q_1$($f_A$(θ) $f_B$(t))=$f_A$(θ)·t.

The scope of the disclosure thus also covers the case wherein the penalty function $q_1$ is not rotationally symmetric about the whitened predetermined kernel $s_\Gamma$ in the sense of depending not only on $d_\Gamma^{(\perp)}$ but also on other components of $d_\Gamma^{(\perp)}$. Introducing such a dependence into the penalty function may be relevant when the whitened noise distribution is itself not symmetric under rotations about the whitened predetermined kernel. Such a scenario may potentially arise, for instance, in a D2MD wafer inspection protocol, when one of the reference dies is an edge die. In which case, edge effects may come into play, which will break the rotational symmetry.

While the disclosure has focused on scanning and inspection of wafers, it will be clear to the skilled person that the disclosed methods and systems may also be applied for defect detection in optical photomasks and reticles used in patterned wafer fabrication.

As used herein, according to some embodiments, the terms "sample analysis" (e.g. wafer analysis) and "sample inspection" (e.g. wafer inspection) may be interchangeable.

As used herein, the terms "gaussian approximation of the likelihood ratio test expression", "gaussian approximation-based expression", and the mathematical expression "$G_{linear}$" may be used interchangeably.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. No feature described in the context of an embodiment is to be considered an essential feature of that embodiment, unless explicitly specified as such.

Although stages of methods according to some embodiments may be described in a specific sequence, methods of the disclosure may include some or all of the described stages carried out in a different order. A method of the disclosure may include a few of the stages described or all of the stages described. No particular stage in a disclosed method is to be considered an essential stage of that method, unless explicitly specified as such.

Although the disclosure is described in conjunction with specific embodiments thereof, it is evident that numerous alternatives, modifications, and variations that are apparent to those skilled in the art may exist. Accordingly, the disclosure embraces all such alternatives, modifications and variations that fall within the scope of the appended claims. It is to be understood that the disclosure is not necessarily limited in its application to the details of construction and the arrangement of the components and/or methods set forth herein. Other embodiments may be practiced, and an embodiment may be carried out in various ways.

The phraseology and terminology employed herein are for descriptive purpose and should not be regarded as limiting. Citation or identification of any reference in this application shall not be construed as an admission that such reference is available as prior art to the disclosure. Section headings are used herein to ease understanding of the specification and should not be construed as necessarily limiting.

What is claimed is:

1. A computerized method for detecting defects or potential defects on a sample, the method comprising operations of:

receiving scan data obtained in a scan of a sample, the scan data corresponding to a tested pixel on the sample;

computing a difference vector d based on the scan data and corresponding reference data;

computing a parameter D, which depends on a vector $t=\Gamma d-(G_{linear}/\|\Gamma s\|^2)\Gamma s$, wherein $\Gamma^T\Gamma=K^{-1}$ with K being a noise covariance matrix corresponding to the tested pixel, s is a predetermined kernel characterizing a defect signal, and $G_{linear}=s\cdot(K^{-1}d)$ is a gaussian approximation of a likelihood ratio test expression for distinguishing the defect signal from noise, and wherein D substantially monotonically increases with $\|t\|$, at least over a range of values of t∥ characteristic of sample analysis; and computing a score q(g, D) indicative of a probability of the tested pixel being defective, wherein g is a parameter indicative of a value of $G_{linear}$, and wherein q(g, D) is a substantially monotonically increasing function of g and a substantially monotonically decreasing function of D, at least for ranges of values of g and D characteristic of sample analysis, thereby generalizing the gaussian approximation-based test to take into account the parameter D and consequently improving defect detection rates.

2. The method of claim 1, further comprising checking whether q(g, D) is greater than a threshold, and labeling the tested pixel as defective, or potentially defective, when q(g, D) is greater than the threshold.

3. The method of claim 1, wherein the scan data of the tested pixel comprise scan data of a plurality of pixels neighboring the tested pixel and the reference data include reference data pertaining to each of the pixels.

4. The method of claim 1, wherein the parameter D depends substantially only on $\|t\|$.

5. The method of claim 1, wherein $q(g, D)=q_0(g)-A(g) \cdot q_1(D)$ with $q_0$ and $q_1$ being substantially monotonically increasing functions and A being a substantially monotonically increasing function or substantially constant, and $q_1 \geq 0$ and $A>0$.

6. The method of claim 5, wherein $q_0(g)$ substantially equals $G_{linear}$, $q_1(D)$ substantially equals $c\|t\|$, with c being a positive constant, and A=1.

7. The method of claim 1, wherein the reference data comprise scan data corresponding to a plurality of previously scanned areas fabricated to a same design as an area comprising the tested pixel.

8. The method of claim 7, wherein the area comprising the tested pixel is non-repetitive within a die comprising the area, or at least along an intersection of the die and a slice comprising the area, and wherein each scanned area, from the plurality of previously scanned areas, is positioned on a respective die from a plurality of dies.

9. The method of claim 7, wherein the area comprising the tested pixel is repetitive within a die comprising the area, or at least along an intersection of the die and a slice comprising the area, and wherein at least one of the scanned areas, from the plurality of previously scanned areas, is positioned along the intersection.

10. The method of claim 1, wherein the scan data comprise scan data corresponding to a multiplicity of perspectives.

11. The method of claim 1, wherein artificial intelligence tools are used in determining a functional dependence of the score q(g, D) on the parameters g and D, a functional dependence of the parameter g on $G_{linear}$, and/or a functional dependence of the parameter D on the magnitude of the vector t.

12. The method of claim 1, comprising checking for potential presence of a plurality of different defect types, characterized by respective predetermined kernels, by serially implementing the operation of computing a parameter D, and the operation of computing a score, with respect to each of the predetermined kernels.

13. The method of claim 12, wherein: (i) a functional dependence of the score q(g, D) on the parameters g and D, (ii) a functional dependence of the parameter g on $G_{linear}$, (iii) a functional dependence of the parameter D on the magnitude of the vector t, (iv) a number of neighboring pixels whose scan data is included in the scan data corresponding to the tested pixel and which are used in computing the respective covariance matrix, (v) a number of references, and/or (vi) a number of perspectives, are dependent on the defect type.

14. The method of claim 1, wherein the noise distribution is non-gaussian and/or non-stationary.

15. The method of claim 14, wherein for sufficiently small noise values the noise distribution is substantially gaussian and for sufficiently large noise values the noise distribution decays exponentially.

16. The method of claim 1, further comprising scanning the sample or one or more regions thereof to obtain the scan data corresponding to the tested pixel as well as scan data corresponding to additional pixels on the sample.

17. The method of claim 16, further comprising performing additional implementations thereof with respect to scan data corresponding to the additional pixels, thereby inspecting the sample or one or more regions thereof.

18. The method of claim 17, wherein the computations involved in computing the scores of the pixels are performed in real-time or near real-time during the scan.

19. The method of claim 16, further comprising:
an initial funneling operation comprising assigning preliminary scores to each pixel in the sample, or one or more regions of the sample, based on the gaussian approximation of the likelihood ratio test; and
for each pixel, whose computed preliminary score is above a threshold score, implementing the operations of computing a parameter D and computing a score q(g, D).

20. A non-transitory computer-readable storage medium storing instructions that cause a processing circuitry to, based on scan data corresponding to a tested pixel and corresponding reference data:
compute a difference vector d;
compute a parameter D, which depends on a vector $t=\Gamma d-(G_{linear}/\|\Gamma s\|^2)\Gamma s$, wherein $\Gamma^T \Gamma = K^{-1}$ with K being a noise covariance matrix corresponding to the tested pixel, s is a predetermined kernel characterizing a defect signal, and $G_{linear}=s \cdot (K^{-1}d)$ is a gaussian approximation of a likelihood ratio test expression for distinguishing the defect signal from noise, and wherein D substantially monotonically increases with $\|t\|$, at least over a range of values of $\|t\|$ characteristic of sample analysis; and
compute a score q(g, D) indicative of a probability of the tested pixel being defective, wherein g is a parameter indicative of a value of $G_{linear}$, and wherein q(g, D) is a substantially monotonically increasing function of g and a substantially monotonically decreasing function of D, at least for ranges of values of g and D characteristic of sample analysis.

* * * * *